United States Patent [19]
Mercer

[11] Patent Number: 5,419,659
[45] Date of Patent: May 30, 1995

[54] PLASTIC MATERIAL MESH STRUCTURE

[75] Inventor: Frank B. Mercer, Lancashire, England

[73] Assignee: P.L.G. Research Limited, Blackburn, England

[21] Appl. No.: 291,044

[22] Filed: Aug. 15, 1994

Related U.S. Application Data

[60] Continuation of Ser. No. 952,978, Sep. 29, 1992, abandoned, which is a division of Ser. No. 628,991, Dec. 17, 1990, Pat. No. 5,156,495, which is a continuation of Ser. No. 506,530, Apr. 6, 1990, abandoned, which is a continuation of Ser. No. 161,155, Feb. 26, 1988, abandoned, which is a division of Ser. No. 14,158, Feb. 12, 1987, Pat. No. 4,756,946, which is a continuation of Ser. No. 787,702, Oct. 15, 1985, abandoned, which is a continuation of Ser. No. 447,936, Dec. 8, 1982, abandoned, which is a division of Ser. No. 195,189, Oct. 8, 1980, Pat. No. 4,374,798, which is a continuation-in-part of Ser. No. 82,523, Oct. 9, 1979, abandoned.

[30] Foreign Application Priority Data

Oct. 16, 1978 [GB] United Kingdom ............... 40641/78
May 25, 1979 [GB] United Kingdom ................. 7918291

[51] Int. Cl.⁶ .............................................. E02D 5/00
[52] U.S. Cl. .................................... 405/258; 405/16; 405/262; 405/284
[58] Field of Search ............... 405/258, 262, 284, 285, 405/15, 16, 270

[56] References Cited

U.S. PATENT DOCUMENTS

| | | |
|---|---|---|
| 776,799 | 12/1904 | Reed . |
| 1,364,493 | 1/1921 | Ford . |
| 1,762,343 | 6/1930 | Munster . |
| 2,079,584 | 5/1937 | Hazell et al. . |
| 2,145,396 | 1/1939 | Kato . |
| 2,294,966 | 9/1942 | Dreyfus . |
| 2,361,369 | 10/1944 | Grebe et al. . |
| 2,582,777 | 1/1952 | Grozinger . |
| 2,742,391 | 4/1956 | Warp . |
| 2,919,467 | 1/1960 | Mercer . |
| 3,051,987 | 9/1962 | Mercer . |
| 3,085,292 | 4/1963 | Kindseth . |
| 3,137,746 | 6/1964 | Seymour . |
| 3,142,109 | 7/1964 | Stoll et al. . |
| 3,252,181 | 5/1966 | Hureau . |
| 3,253,072 | 5/1966 | Scragg . |

(List continued on next page.)

FOREIGN PATENT DOCUMENTS

| | | |
|---|---|---|
| 873556 | 7/1979 | Belgium . |
| 954261 | 9/1974 | Canada . |
| 368393 | 12/1906 | France . |

(List continued on next page.)

OTHER PUBLICATIONS

"Concrete and Constructional Engineering", Oct. 1946, pp. 285-289 Coyne.

Chang, et al. Article, pp. 1-7, Publication has not been identified.

"A Course of Elementary Fortification", London, 1822, pp. 562-565, 587, 638-642–Pasley Book.

(List continued on next page.)

*Primary Examiner*—Dennis L. Taylor
*Attorney, Agent, or Firm*—Jacobson, Price, Holman & Stern

[57] ABSTRACT

A reinforced civil engineering structure is formed by embedding in soil one or more horizontal layers of a flexible, integral, plastics material mesh structure having oriented strands and transverse members with relatively large mesh openings. In the mesh structure, the orientation of the strands penetrates into the zones of the intersections of the strands and transverse members but the intersection zones have portions which are unorientated or substantially less orientated than the midpoints of the strands. The mesh structure has been formed by stretching a sheet of starting material having a thickness of not less than 1.5 mm and a pattern of holes whose centers lay on a square or rectangular grid, the stretching being parallel to one of the axes of the grid. The soil engages in the mesh openings, and the mesh structure provides good slip resistance properties and good stress transmission paths.

65 Claims, 9 Drawing Sheets

U.S. PATENT DOCUMENTS

| | | |
|---|---|---|
| 3,255,065 | 6/1966 | Wyckoff . |
| 3,315,718 | 4/1967 | Berman . |
| 3,365,352 | 1/1968 | Van Burleigh et al. . |
| 3,384,530 | 5/1968 | Mercer et al. . |
| 3,386,876 | 6/1968 | Wyckoff . |
| 3,387,077 | 6/1968 | Sammons et al. . |
| 3,405,027 | 10/1968 | Wyckoff . |
| 3,421,326 | 1/1969 | Vidal . |
| 3,441,638 | 4/1969 | Patchell et al. . |
| 3,444,588 | 5/1969 | Martin et al. . |
| 3,468,461 | 9/1969 | Rasmussen . |
| 3,488,415 | 1/1970 | Patchell . |
| 3,500,627 | 3/1970 | Kim et al. . |
| 3,505,157 | 4/1970 | Fields et al. . |
| 3,515,778 | 6/1970 | Fields et al. . |
| 3,554,853 | 1/1971 | Mercer et al. . |
| 3,562,825 | 2/1971 | Larsen . |
| 3,616,154 | 10/1971 | Dow et al. . |
| 3,623,937 | 11/1971 | Gasaway . |
| 3,642,967 | 2/1972 | Doll . |
| 3,666,609 | 5/1972 | Kalwaites et al. . |
| 3,686,873 | 8/1972 | Vidal . |
| 3,746,607 | 7/1973 | Harmon . |
| 3,756,300 | 9/1973 | Nalle . |
| 3,851,034 | 11/1974 | Harmon et al. . |
| 3,881,381 | 5/1975 | Kalwaites . |
| 3,914,365 | 10/1975 | Kim et al. . |
| 3,922,329 | 11/1975 | Kim et al. . |
| 3,925,994 | 12/1975 | Broms et al. .......... 405/258 |
| 3,950,475 | 4/1976 | Dow et al. . |
| 3,952,127 | 4/1976 | Orr . |
| 3,954,933 | 5/1976 | Rasmussen . |
| 4,013,752 | 3/1977 | Kalwaites et al. . |
| 4,020,208 | 4/1977 | Mercer et al. . |
| 4,059,713 | 11/1977 | Mercer . |
| 4,062,995 | 12/1977 | Korpman . |
| 4,075,379 | 2/1978 | Lloyd . |
| 4,101,358 | 7/1978 | Kim et al. . |
| 4,116,010 | 9/1978 | Vidal . |
| 4,117,686 | 10/1978 | Hilfiker . |
| 4,123,491 | 10/1978 | Larsen . |
| 4,135,023 | 1/1979 | Lloyd et al. . |
| 4,140,826 | 2/1979 | Liu . |
| 4,152,479 | 5/1979 | Larsen . |
| 4,186,781 | 2/1980 | Kim et al. . |
| 4,324,508 | 4/1982 | Hilfiker . |
| 4,329,089 | 5/1982 | Hilfiker . |
| 4,343,571 | 8/1982 | Price . |
| 4,374,798 | 2/1983 | Mercer . |
| 4,391,557 | 7/1983 | Hilfiker et al. . |
| 4,421,439 | 12/1983 | Burg et al. . |
| 4,455,337 | 6/1984 | Lloyd . |
| 4,610,568 | 9/1986 | Koerner . |
| 4,756,946 | 7/1988 | Mercer . |

FOREIGN PATENT DOCUMENTS

| | | |
|---|---|---|
| 656692 | 5/1929 | France . |
| 1173383 | 2/1959 | France . |
| 1393988 | 2/1963 | France . |
| 1566717 | 3/1969 | France . |
| 1601073 | 8/1970 | France . |
| 2098500 | 3/1972 | France . |
| 2098707 | 3/1972 | France . |
| 2131841 | 11/1972 | France . |
| 2131842 | 11/1972 | France . |
| 2138198 | 1/1973 | France . |
| 2195555 | 3/1973 | France . |
| 2347171 | 11/1977 | France . |
| 94251 | 12/1972 | German Dem. Rep. . |
| 1266950 | 4/1968 | Germany . |
| 1435107 | 10/1968 | Germany . |
| 2626650 | 12/1977 | Germany . |
| 52878 | 9/1975 | Greece . |
| 55225 | 3/1968 | Luxembourg . |
| 68/0026 | 1/1968 | South Africa . |
| 397492 | 8/1933 | United Kingdom . |
| 726682 | 3/1955 | United Kingdom . |
| 836555 | 6/1960 | United Kingdom . |
| 900083 | 7/1962 | United Kingdom . |
| 914489 | 1/1963 | United Kingdom . |
| 922131 | 3/1963 | United Kingdom . |
| 969205 | 9/1964 | United Kingdom . |
| 969655 | 9/1964 | United Kingdom . |
| 982036 | 2/1965 | United Kingdom . |
| 1054946 | 1/1967 | United Kingdom . |
| 1055963 | 1/1967 | United Kingdom . |
| 1058445 | 2/1967 | United Kingdom . |
| 1069361 | 3/1967 | United Kingdom . |
| 1075487 | 7/1967 | United Kingdom . |
| 1083847 | 9/1967 | United Kingdom . |
| 1110051 | 4/1968 | United Kingdom . |
| 1116181 | 6/1968 | United Kingdom . |
| 1153981 | 6/1969 | United Kingdom . |
| 1153998 | 9/1969 | United Kingdom . |
| 1170639 | 11/1969 | United Kingdom . |
| 1170640 | 11/1969 | United Kingdom . |
| 1213428 | 11/1970 | United Kingdom . |
| 1235901 | 6/1971 | United Kingdom . |
| 1258720 | 12/1971 | United Kingdom . |
| 1267300 | 3/1972 | United Kingdom . |
| 1290437 | 9/1972 | United Kingdom . |
| 1306686 | 2/1973 | United Kingdom . |

OTHER PUBLICATIONS

"Durability and Long-term performance of Tensar Polymer grids for soil Reinforcement" Wrigley, Materials Science and Technology, Mar. 1987, vol. 3, pp. 161–170.

(List continued on next page.)

OTHER PUBLICATIONS

"Critical Aspects of Industrial and Academic Collaboration", The Philips Lecture given on Oct. 1986 to the Royal Society 1987 by F. B. Mercer.

"Soil Reinforcement", John, Civil Engineering Oct. 1979.

"Experimental Studies on the Improvement of the Net Bearing Capacity of Soft Ground by Laying a Resinous Net", pp. 144–150, 1970.

"Structural Effect of Restraint Layer on Subgrade of Low Bearing Capacity in 'Flexible Pavement'", pp. 381–389, Ann Arbor, 1967.

"Reinforced Soil", John, Chartered Municipal Engineer vol. 106, Jun. 1979.

"Tensar Geogrids in Civil Engineering".

"Geotextiles as Earth Reinforcement in the United Kingdom", Ingold, Ground Engineering, Apr. 1984, pp. 29–32.

"Using Fabrics to the Full", Civil Engineering, Dec. 1977, pp. 59, 61, 63 and 65.

"101 Uses for Earth Reinforcement", Civil Engineering, Jan. 1979 pp. 51–57.

Netlon Report 1970.

"Netlon In Ground Restraint and Soil Reinforcement", brochure, printed Sep. 1979.

"The Comparative Performance of Polymer Net Reinforcement", Ingold & Templeman, Mar. 20, 1979, pp. 65–70, vol. I and pp. 44–45, vol. III.

"Le Genie Civil", vol. XE1, No. 18, pp. 432–433, Coyne.

"Le Genie Civil", 1 and 15, May 1945.

Takiron Trical Net Brochure (Japanese version), 15 pp., publication unknown.

Takiron Trical Net Brochure (English version), 15 pp., publication unknown.

Symposium on Earth Reinforcement, Reinforcement of Railway Embankments in Japan, Iwasaki et al. American Society of Civil Engineers Annual Convention, Apr. 1978, published 1979, pp. 473–500.

Study on Embankement for Concrete Slab Track upon Felxible Pavement–Reinforced Embankement with Net–Uezawa et al., Quarterly Reports, vol. 15, No. 1, 1974, pp. 121–124.

Membranes in Ground Engineering, Rankilor, 1981, pp. 96 and 172–181.

New Mesh with a Hundred Uses, Nylex Contact, Nylex Corp. Ltd. News, vol. 12, No. 6, 1969, pp. 1 and 2.

'Netlon' Mesh Structures for Ground Restraint and Stabilisation, 8 pp., Nov., 1976.

B. B. Broms, "Polyester Fabric As Reinforcement In Soil", C. R. Coll. Int. Sols Textiles, Paris, 1977, pp. 129 to 135.

Kern, F., Centre Technique du Genie Rural, "Realisation d'un barrage en terre avec parement aval vertical au moyen de poches en textile", C. R. Coll. Int Sols Textiles, Paris, 1977, pp. 91–93. (with English translation).

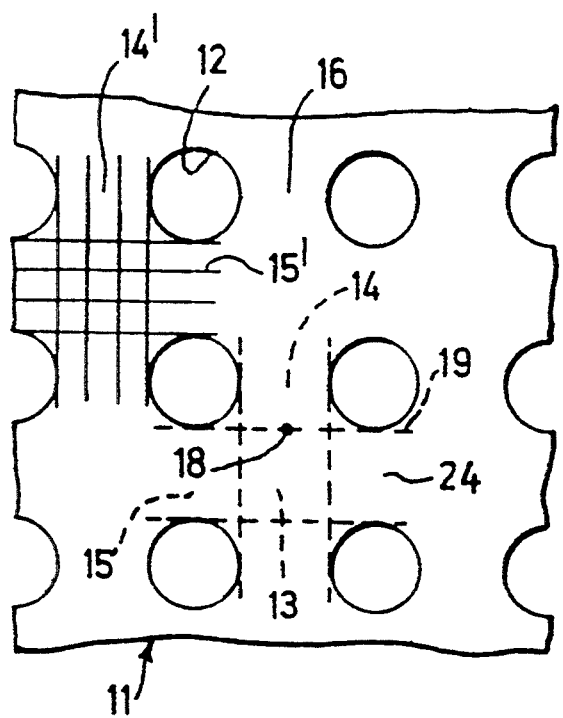
FIG. 1
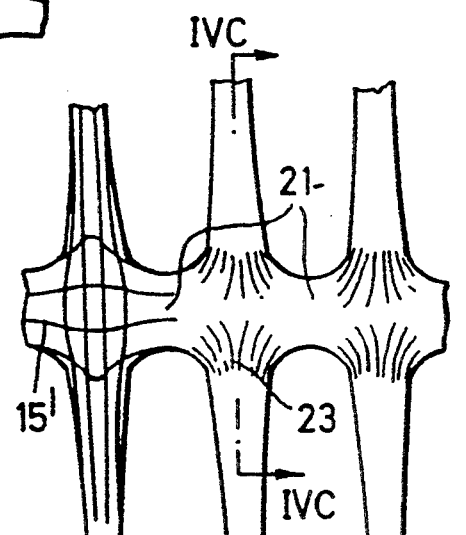
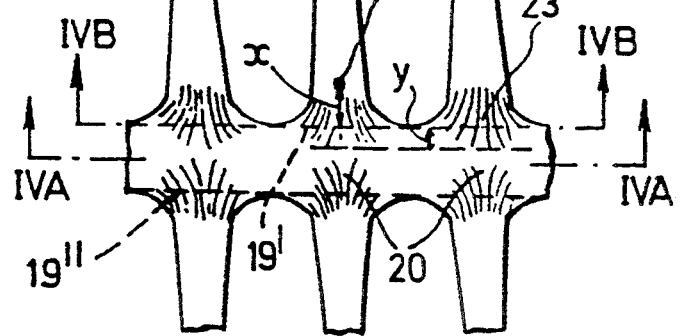
FIG. 2

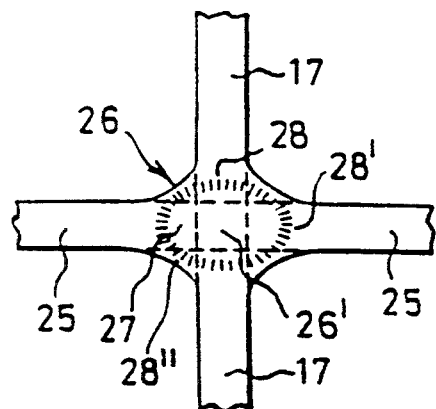
FIG. 5
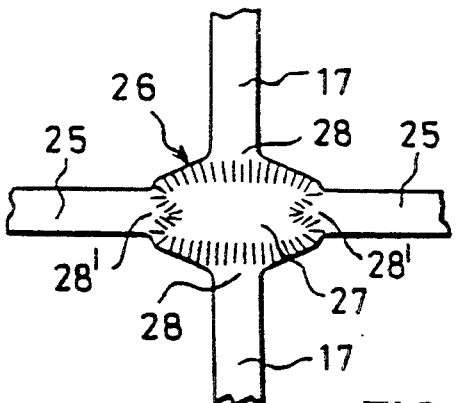
FIG. 6
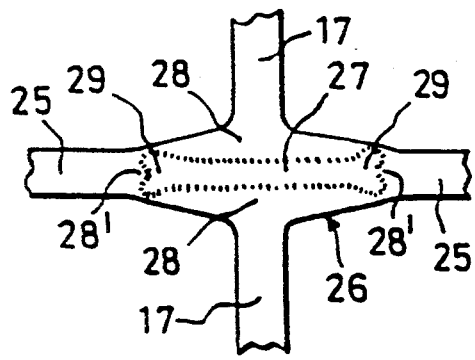
FIG. 7
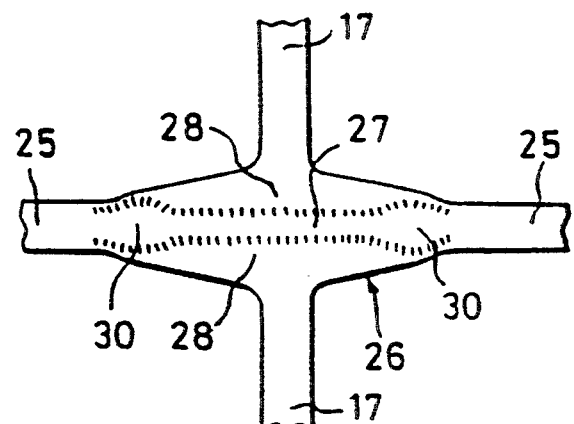
FIG. 8
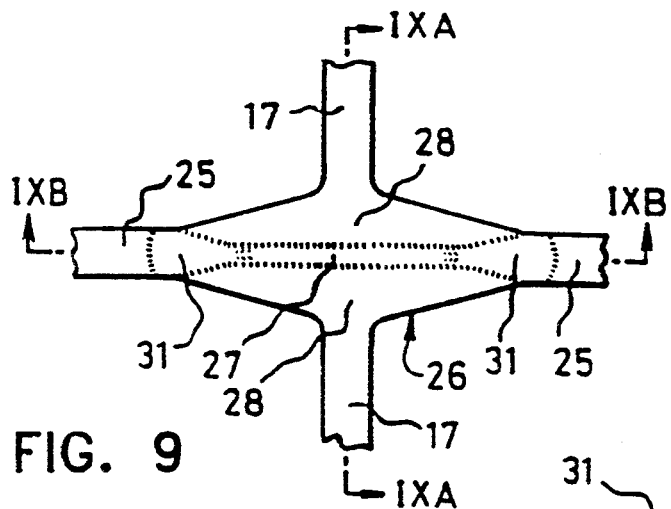
FIG. 9
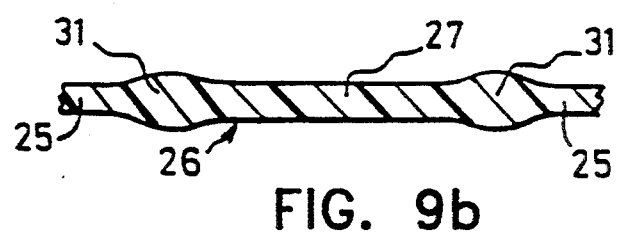
FIG. 9a
FIG. 9b

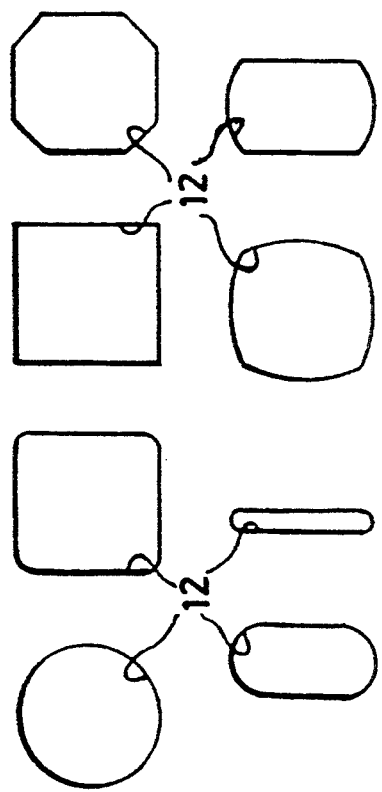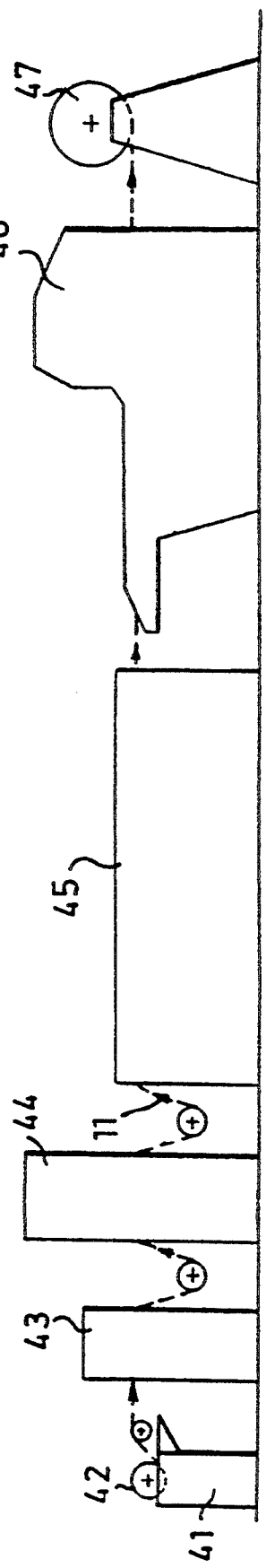

FIG. 12
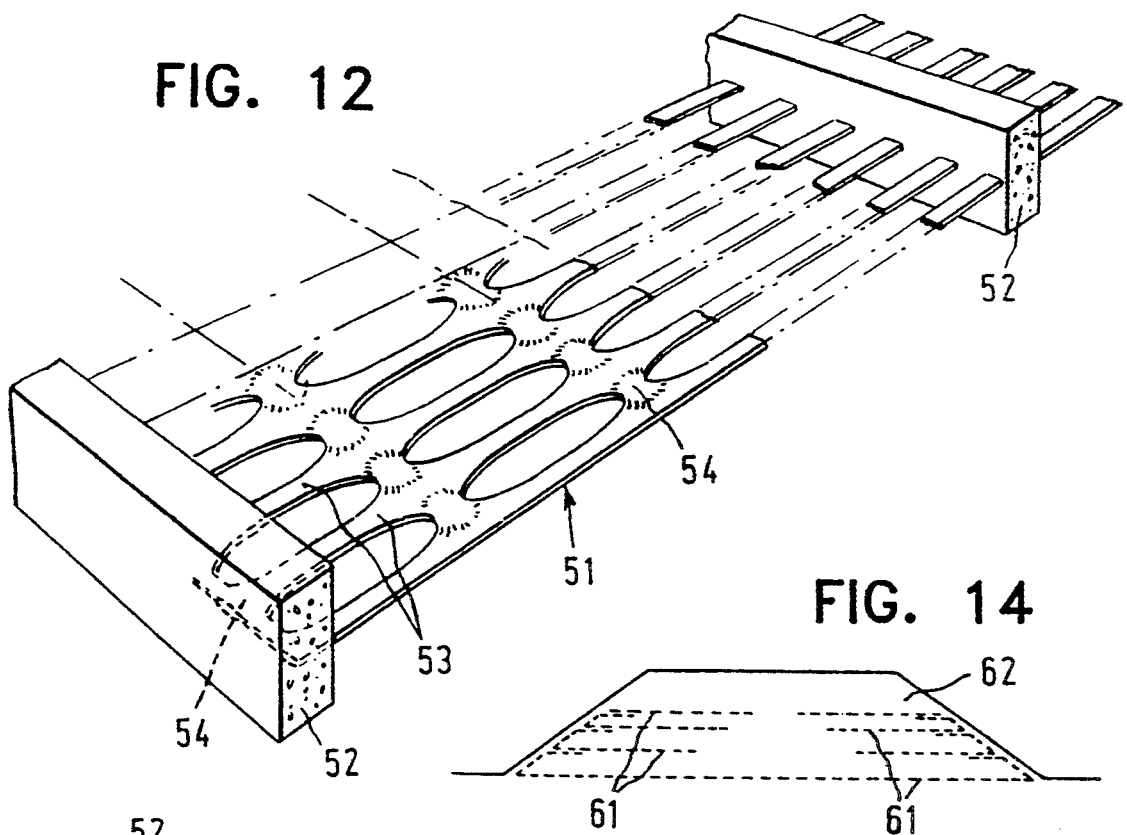
FIG. 14
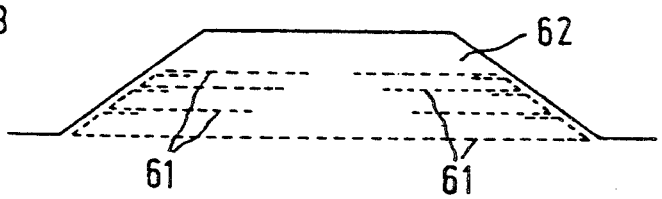
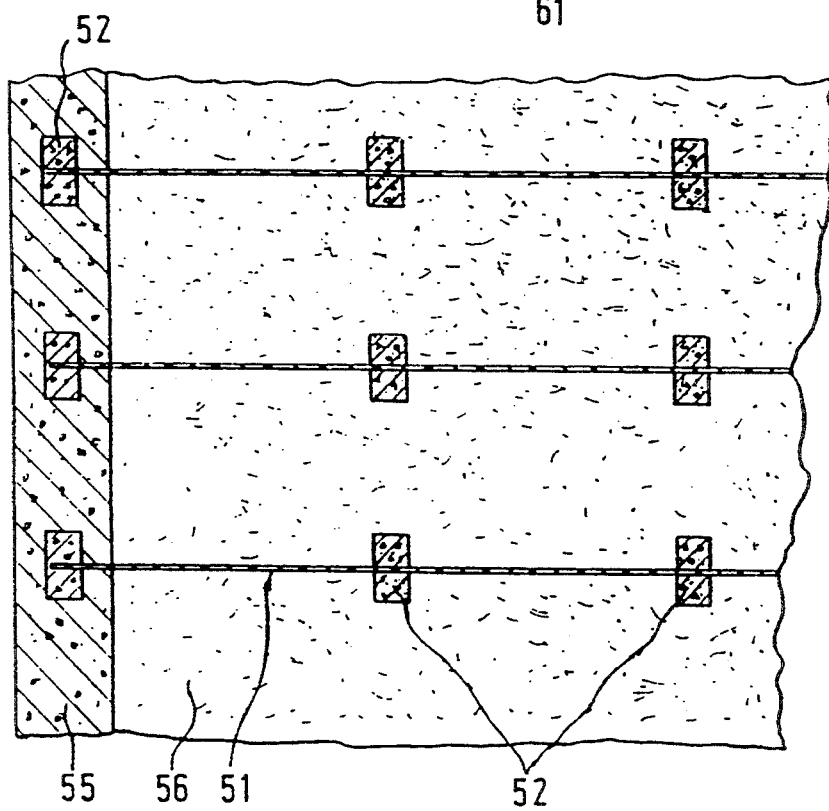
FIG. 13

5,419,659

PLASTIC MATERIAL MESH STRUCTURE

REFERENCE TO RELATED APPLICATIONS

This application is Continuation of U.S. application Ser. No. 07/952,978 Filed Sep. 29, 1992, now abandoned, which in turn is a divisional of U.S. application No. 628,991, filed Dec. 17, 1990 (now U.S. Pat. No. 5,156,495 granted Oct. 20, 1992), which in turn is a continuation of application Ser. No. 506,530 filed Apr. 6, 1990 (now abandoned), which in turn is a continuation of application Ser. No. 161,155 filed Feb. 26, 1988 (now abandoned), which in turn is a divisional of application Ser. No. 014,158 filed Feb. 12, 1987 (now U.S. Pat. No. 4,756,946 granted Jul. 12, 1988), which in turn is a continuation of U.S. Ser. No. 787,702 filed Oct. 15, 1985 (now abandoned), which in turn is a continuation of U.S. Ser. No. 447,936 filed Dec. 8, 1982 (now abandoned), which in turn is a divisional of U.S. Ser. No. 195,189 filed Oct. 8, 1980 (now U.S. Pat. No. 4,374,798 granted Feb. 22, 1982), which in turn is a continuation-in-part of U.S. Ser. No. 082,523 filed Oct. 9, 1979 (now abandoned), the subject matter of all of which are incorporated herein by reference.

BACKGROUND OF THE INVENTION

The present invention relates to plastics material integral mesh structures having mesh openings defined by a generally rectangular grid of substantially parallel, orientated strands and junctions therebetween, and also to an intermediate structure which is produced when making the final structure and which has in itself commercial uses.

A problem in all integral mesh structures relates to the junctions. The junctions should be sufficiently strong without containing too much plastics material.

U.K. Patent Specification No. 982 036 describes the production of rectangular grid mesh structures by stretching a substantially monoplanar plastics material sheet comprising a pattern of holes whose centres lie on a rectangular grid; the sheet is stretched biaxially in two directions parallel to the axes of the grid. The junctions so produced are not stretched and are thick and heavy.

U.K. Patent Specification No. 1 310 474 describes structures whose junctions are strong enough for the light duty applications with which the Patent Specification is concerned but are not strong enough for heart duty applications. FIG. 5 of the Patent Specification shows two pairs of strands running into the junction, and the junction is formed of crotch filaments, a centre filament and thin webs. The webs may be about hair thickness of the strands. It is found that on rupture, the structure very often breaks at the junction, a split starting in a web, which acts as a tear starter, and running along the strands. The alternative structure illustrated in FIG. 4 is very similar except that the centre filament is absent, and its behaviour is similar.

U.K. Patent Specification No. 1 544 608 describes structures which are thin and flat, the junctions being no thicker than the strands. It is believed that a flat junction is not the strongest junction as, at the very centre of the junction, there is an area of random molecular arrangement which has less resistance to rupture than the molecularly orientated areas which surround it; the surrounding areas have the same thickness as, and are therefore stronger than, the centre area.

DEFINITIONS

The term "rectangular" includes square.

The term "orientated" means molecularly orientated.

The term "rows" and "columns" are used for convenience to denote the axes of the rectangular grid. Unless specified otherwise, it does not matter if the rows extend in the machine direction (MD) or in the transverse direction (TD).

The terms "thick", "thin", "thickness", "deep", "depth", and "shallow" refer to the dimension normal to the plane of the starting material or mesh structure and the terms "wide", "narrow", and "width" refer to the appropriate dimension in the plane of the starting material or mesh structure.

The thickness of the starting material or mesh structure is the distance between the extreme faces of the starting material or mesh structure.

The thickness or depth of a strand is the thickness of the strand cross-section, but ignoring raised edges. Particularly if the original holes or depressions have no radiussing where they issue at the faces of the starting material, the strands will have a "pin-cushion" cross-section, with raised edges and lower centres; the thickness or depth will be as measured inwardly of the raised edges.

The notional junction zones of the starting material are notional zones defined by the intersection of the notional parallel-sided zone which lies between and is tangential to two columns of holes or depressions and the notional parallel-sided zone which lies between and is tangential to two rows of holes or depressions.

The term "tangential" includes touching, but not intersecting, a straight sided hole, depression or opening or touching a corner of a hole, depression or opening.

The depressions are not necessarily formed by the application of pressure.

Stretch ratios are either given overall or "on the strands". If they are given on the strands, they are measured by measuring the distance moved by the respective ends of the openings on either side of the strand. For the second stretch, the ratios are measured by comparing the stretched lengths with the original starting material and not with the material as after the first stretch. The ratios are as measured after relaxation.

THE INVENTION

The invention provides both methods and structures manufactured by the methods.

In the method of one embodiment of the invention, uniaxial orientation is used and the structures so produced are principally uniaxially orientated. In the method of another embodiment, biaxial orientation is used, and the structures so produced are biaxially orientated.

The starting material, when biaxially stretched in accordance with one embodiment of the invention, produces junctions between the strands which are not flat but do not exhibit any excessive thinning, and there are no filaments within the junctions. The whole junction has a minimum thickness which is not less than 75% of the thickness of the mid-point of any of the strands passing into the junction. Each junction is a solid junction as opposed to an openwork junction formed by a framework of sub-filaments and film or by an orientated thin film area bounded about its perimeter by orientated filaments. The junctions have a central zone which is thicker than orientated lateral zones on at least two opposite sides thereof which central zone can if desired include some unorientated material (or there may be two small, spaced unorientated zones on either side of the centre of the junction). This unorientated or random orientated central zone is thicker than the strands and thus can have sufficient strength to prevent rupturing occuring in the centre of the junction. The junctions maintain a shape which provides good stress transmission paths and permits the junction to withstand high forces between either pair of aligned strands or between two strands initially at 90° to each other. The structure is strong enough to be used for instance as stock fencing, provided the strands are of sufficiently heavy gauge, or relatively strong light-weight structures can be provided for instance for olive harvesting.

DESCRIPTION OF PREFERRED EMBODIMENTS

The invention will be further described, by way of example, with reference to the accompanying drawings, in which:

FIGS. 1, 2 and 3 show three stages in a method in accordance with the invention;

FIGS. 5 to 9 show the junctions in five structures produced by the method;

FIGS. 9a and 9b are sections taken along the lines IXA—IXA and IXB—IXB of FIG. 8;

FIG. 10 shows various shapes of holes or depressions that can be used in the starting material;

FIGS. 11 and 11a are schematic elevations of two different plants for making biaxially stretched structures in accordance with the invention;

FIG. 12 is a perspective view of a stabilising or retaining structure in accordance with the invention;

FIG. 13 is a vertical section through a wall, earth retained thereby and structures as in FIG. 12;

FIG. 14 is a vertical section through an embankment stabilised in accordance with the invention;

Figure 20:
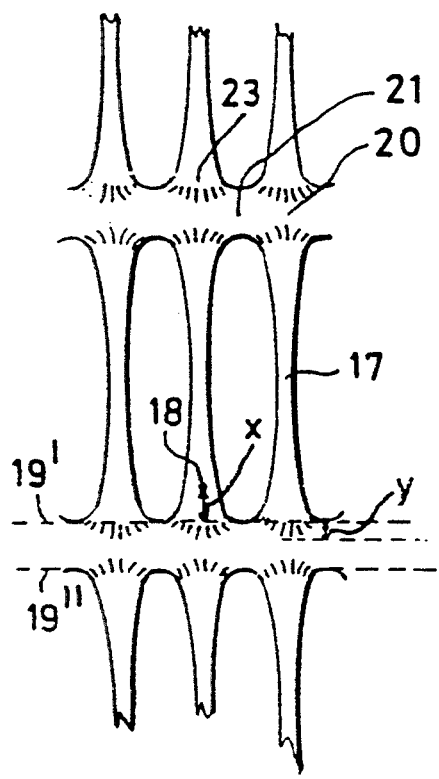
Figure 21:
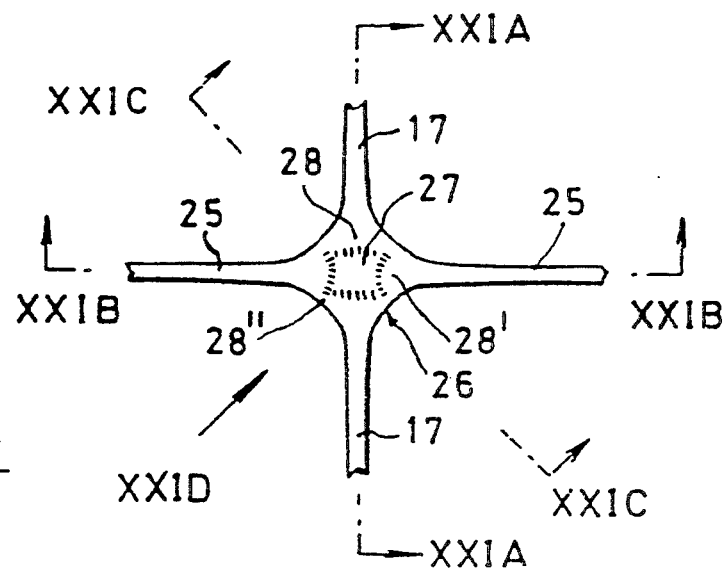
Figure 21A:
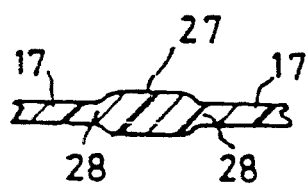
Figure 21B:
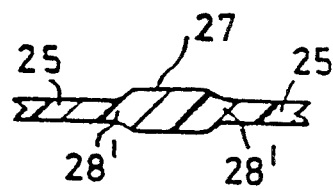
Figure 21C:
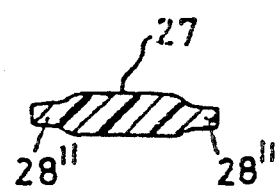
Figure 21D:
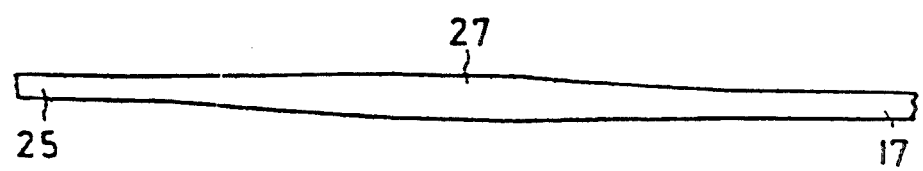
Figure 22:
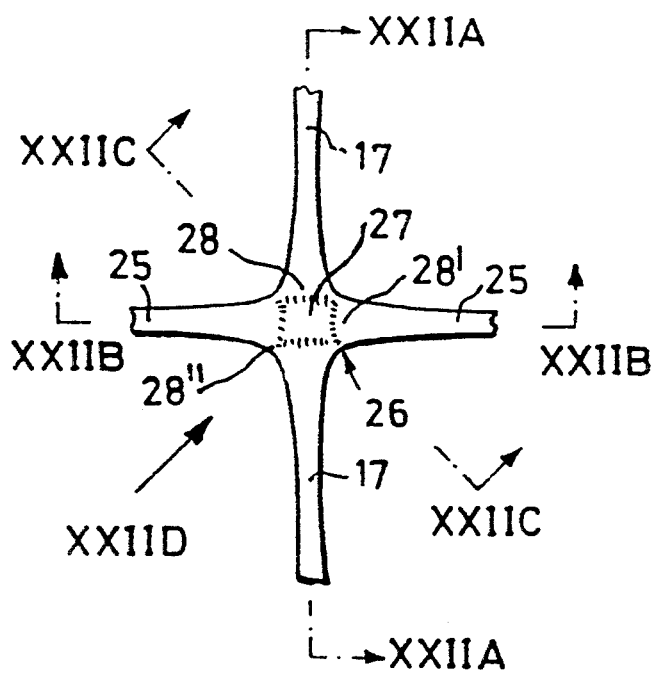
Figure 22A:
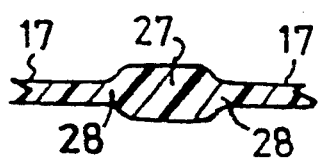
Figure 22B:
Figure 22C:
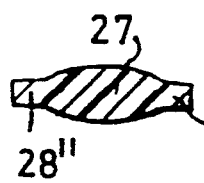
Figure 22D:
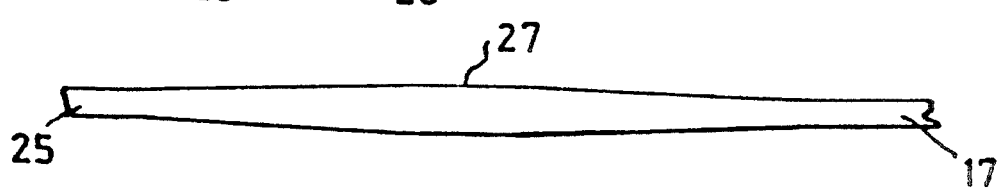

FIG. 20 corresponds to FIG. 2, but shows a slightly different structure;

FIG. 21 shows the junction of a structure made from the structure of FIG. 20,

FIGS. 21a to 21d are schematic sections taken along the lines XXIA—XXIA, XXIB—XXIB and XXIC—XXIC of FIG. 21, not to scale;

FIG. 21d is a schematic developed view of the crotch edge, generally looking in the direction of the arrow XXID in FIG. 21, not to scale; and FIGS. 22 to 22d correspond to FIGS. 21 to 21d, but show a slightly different structure.

In FIGS. 2, 5 to 9, 12, 21 and 22, the hatching indicates a steep slope (increase in thickness), the hatching lines extending up the slope.

UNIAXIALLY STRETCHED STRUCTURES

Looking at FIG. 1, the starting material is a sheet of plastics material 11 having planar faces and in which are formed circular holes or depressions 12. The "holes" 12 need not pass right through the sheet and can be depressions in one or both sides of the sheet, leaving a continuous membrane, preferably on the median plane of the sheet. FIG. 1 shows what is termed herein a notional junction zone 15, namely the notional zone defined by the intersection of the notional parallel-sided zone 14 which lies between and is tangential to two columns of holes or depressions 12, and the notional parallel-sided zone 15 which lies between and is tangential to two rows of holes or depressions 12. FIG. 1 also shows truth lines 14', 15' which would not be used in commercial operation but can be scribed or drawn on the plastics material to show what is happening.

Figure 4A:
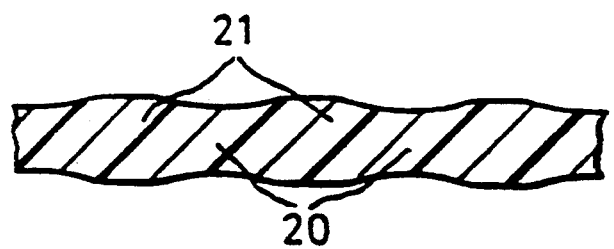
FIGS. 4a, 4b and 4c are sections along the corresponding lines shown in FIG. 2.
Figure 4B:
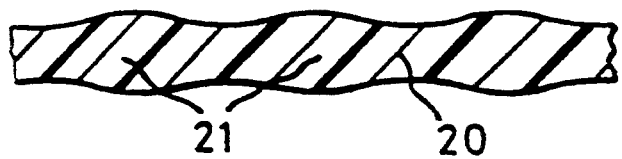
Figure 4C:
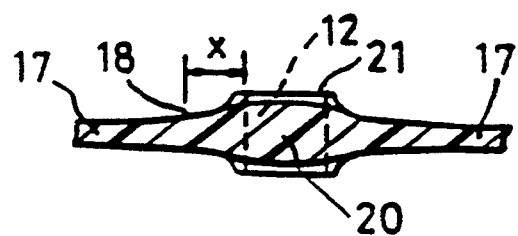

When the sheet 11 is drawn in the vertical direction (looking at FIG. 1) the structure of FIG. 2 is formed because the zones 16 (FIG. 1) are stretched and orientated into strands 17. The stretching is performed to such an extent, for instance to a ratio of 7:1 on the strands, that the outermost portions of the notional junction zones 13 are orientated and stretched out to form the end portions of the strands 17, which merge smoothly with the remainder of the strand (see FIG. 4c) ie, the orientation of the strands 17 continue beyond the notional straight lines at 17', the orientation thereby penetrating into the bars; the orientation can pass right through or nearly through the centre of each notional junction zone 13. A notional point 18 (FIG. 1), which on the starting sheet 11 lay on the notional straight line 19 which is parallel to and tangential to the rows of holes or depressions 12 has moved into the corresponding strand (FIG. 2) so that it is spaced from the corresponding notional straight line 19' by a substantial distance x (FIGS. 2 and 4c). This is also illustrated by the truth lines 15' in FIG. 2. The distance x is preferably not less than 25% of the thickness of the mid-point of the strands 17 and more preferably not less than such thickness.

In effect, the notional parallel-sided zones 15 form bars running horizontally as seen looking at FIG. 2, each comprising a succession of alternate zones, namely first zones 20 between and interconnecting the ends of aligned strands 17 and second zones 21 between the first zones 20. The second zones 21 are not substantially orientated, and it will be seen from FIG. 4a that they still maintain the original thickness of the sheet 11. They have flat outer faces in FIG. 4a, and may also have flat outer faces in FIG. 4b. However, the first zones 20 have been orientated (see the undulating top and bottom surfaces in FIG. 4a); the orientation can pass right through the first zones 20 in the direction of strands 17, forming a trough in the horizontal bar, as can be seen in FIG. 4a, all of the first zone 20 being orientated in the direction of the strands 17. The centre of each first zone 20 (corresponding to the mid-point of the notional junction zone 13) is substantially thicker and less orientated than the strands 17 (see FIG. 4c), and can have a thickness ranging from just somewhat thicker than the strands 17 to the thickness of the starting material 11. If all the first zone 20 is orientated, its centre third may be stretched to a ratio of at least 1.5:1. If the central part of the first zone 20 is not stretched, the length of the part that has not been stretched may be for example up to five times its thickness if the bars are wide or not greater than its thickness. In the structure shown in FIG. 4c, there is a gradual increase in thickness from the point 18 to the centre of each first zone 20. At 23 in FIG. 2, the material of the notional junction zone 13 is drawn out, forming a re-entrant on either side of the first zone 20.

Figure 4D:
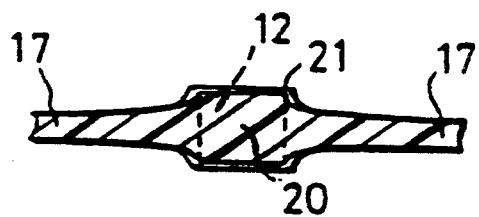
FIG. 4d is a section corresponding to that of FIG. 4c, but shows a variation.

FIG. 4d illustrates a variant that can occur. The orientation has passed right through the first zone 20 but there has only been a slight thinning in the centre of the zone 20, there being sharper steps down to the thickness of the strands 17 near the edges of the zone 20.

For uniaxially stretched structures, the starting material can be of any suitable thickness from 0.75 mm upwards; better structures can be produced with starting material thickness of at least 1 mm.

The distance between adjacent holes or depressions 12 in the starting material 11 may be greater than the thickness of the starting material 11 at the same point.

The uniaxially stretched structures can find many uses, as set forth below. By having the orientation passing into the first zones 20, there is a saving of plastics material, by having the orientation passing right through the first zones 20, there is a degree of orientation connecting aligned strands 17 and a reduction in the amount of yield which would occur within the bar under tension in the vertical direction (as seen in FIG. 2); and by having the centre of each notional junction zone 13 substantially less orientated, there is a reduced danger of splitting when flexing the bars.

BIAXIALLY STRETCHED STRUCTURES

Figure 3:
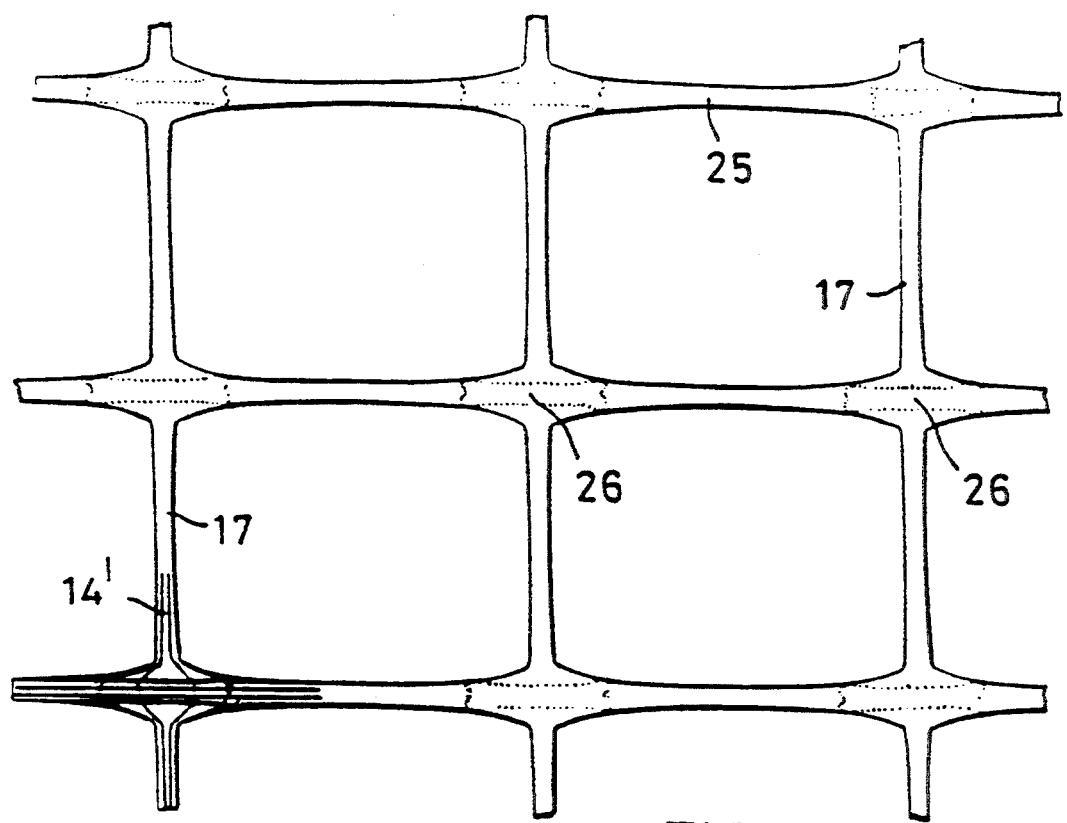

The structure of FIG. 2 can alternatively be subjected to a second stretching operation, in the horizontal direction as seen looking at FIG. 2. The effect of this second stretching operation is to draw out the zones 24 indicated in FIG. 1, which correspond to the second zones 21 shown in FIG. 2, forming further strands 25 as shown in FIG. 3. At the same time, it is found that if no tension is applied in the vertical direction, the length of the openings in the direction of the first stretching operation is reduced, possibly by up to 33%, and the end portions of the strands 17 are either partly or fully drawn into the junctions and even drawn out in the direction of the second stretching operation to form end portions of the strands 25 shown in FIG. 3, the structure shortening correspondingly in the first direction. This is illustrated by the truth lines 14' in FIG. 3. Thus the outermost portions of the original notional junction zones 13, at the end of the first stretching operation, can have an orientation which is in the direction of the first stretching, and, at the end of the second stretching operation, can have a predominant orientation which is in the direction of the second stretching or can have approximately equal orientation in each of these two directions. The amount of this effect depends upon the overall stretch ratios in the two stretching operations, which are discussed further below.

It is believed that if a degree of orientation passes right through or at least nearly right through the notional junction zone 13, a better junction can be produced in the final product. However it has been found that orientation need not even pass nearly right through the zone 13.

FIGS. 5 to 9, 21 and 22 illustrate some examples or junctions 26 which are formed between the strands 17,25. As indicated above, the first stretch was up and down the sheet of drawings and the second stretch was across the sheet. It will be seen that each of these junctions 26 is of generally lozenge or lenticular shape (particularly in FIGS. 7 to 9) with its major axis or maximum dimension aligned with the strands 25 formed in the second stretching operation and larger or much larger than its minor axis or minimum dimension, which is aligned with the strands 17. The sides of the junction 26 form curved crotches and merge very gradually with the sides of the strands 25 but merge relatively abruptly with the sides of the strands 17. The size of the junction 26 is much larger than that of the notional intersection zone 26' would be formed by the intersection of the strands 17, 25 (see FIG. 5).

Each junction 26 is substantially symmetrical about a plane parallel to the plane of the mesh structure, namely the median plane of the mesh structure, but each junction 26 is not flat, having a specific contour. The minimum thickness of each junction 26 is not less than 75% of the thickness at the mid-point of any of the strands 17, 25; it is believed that as the minimum thickness decreases below the thickness of the mid-point of the thickest strand 17 or 25, down to 90% or 80% of the value, or below, the strength of the junction decreases. The maximum thickness of the junction is substantially greater than the minimum thickness and substantially greater than the thickness of the mid-point of any of the strands 17, 25.

It is normal practice to measure the thickness of a mesh strand at its mid-point and this is the point; one would naturally choose. However, it has been observed that, particularly if the original holes or depressions were circular, the mid-point of a strand may not be its thinnest point.

Each junction 26 has a central zone 27 which is thicker than orientated lateral zones 28, 28' on at least two opposite sides thereof and normally thicker than the mid-points of at least two of the strands 17, 25. Thus, in FIGS. 5 to 9, 21 and 22, there is a substantial increase in thickness as one passes through the junction 26 from one strand 17 to the aligned strand 17. If the orientation did not pass right through the first zones 20 during the first stretch, the central zone 27 would tend to be thicker. In general, the central zone 27 will be substantially less orientated than the lateral zones 28, 28' and the centre part of the central zone 27 may not even be orientated, though the major part of the junction should be orientated. In the worse case, only 70% of the plan area of the junction would be orientated. There is a high degree of orientation in the direction running around the crotches between adjacent strands 17, 25.

It will be seen that the stretching is effected until the edge zones of the crotches which extend between respective adjacent pairs of strands 17, 25 passing into the junction 26 are orientated in the direction running around the respective crotch, and the stretching is terminated while each junction 26 has a minimum thickness not less than 75% of the thickness of the mid-point of any of the strands 17,25 passing into the junction, has a maxim thickness substantially greater than its minimum thickness and substantially greater than the thickness of the mid-point of any of the strands passing into the junction 26, and has a central zone 27 which is thicker thin orientated zones on two opposite sides thereof.

In practice, it is found that a useful way of determining the process parameters for new structures is to stretch material in the laboratory, for the first stretch observing by eye the penetration of the orientation into the zones 20, and for the second stretch observing by eye the drawing out of the zones 21 until the orientation passes from the ends of the strands 25 so formed around the crotches to the strands 17, the subsequent thinning down of the crotches, and the changing contour of the junction as the orientation progresses from the ends of the strands 25 into the junction. In this manner, with a given starting material, the desired stretch ratios can be determined for the first and second stretches—the stretch ratios should be taken say 5% beyond those desired to allow for relaxation.

As noted above, the junction 26 of FIGS. 7 to 9 has its major axis aligned with the direction of the second stretching operation, i.e. of the strands 25, and the structure will have greater strength in this direction if the cross-sections end spacings of the strands 17 and 26 are equal. The ratio of the major to minor dimensions of the junction 26 can be varied and a more balanced orientation and shape produced by careful selection of the stretch ratios in the two stretching operations. Although the ratio applied during the second stretching operation can be greater than that applied during the first stretch operation, some of the second stretching is involved in pulling out the junctions end shortening the strands 17. Increasing the stretch ratio in the second stretching direction increases the strength in that direction but reduces the strength in the other direction.

It will be seen that in all the junctions 26 except those of FIGS. 6 and 9, there is no steep slope (rapid increase in thickness) or abrupt change in thickness when one looks parallel to the plane of the structure at the profile of the edge of any crotch between the strands 17 and 25. Furthermore there is a marginal zone 28" extending around each crotch which is relatively flat and is of significant width, this feature being most marked in the structures of FIGS. 5, 21 and 22. It is believed advantageous to have such crotch edges and such crotch marginal zones 28" as the mount of plastics material in the junction is reduced without gross loss of strength. In the best structures of this type, a slope angle of up to 5° (10° included angle for both sides) can be formed, as measured on a developed view of the crotch edge, though significant savings in plastics materials are possible up to angles of 35° (70° included angle). As mentioned above, the centre part of the central zone 27 may not be orientated i.e. having the thickness of the original starting material. This in particular is acceptable if the edges and marginal zones referred to above are present. Such edges and marginal zones 28" can be obtained with the procedure for making a FIGS. 21 or 22 junction, as described below.

Alternatively, if there is a steep slope on the crotch edge or no marked marginal zone (as in FIGS. 6 and 9), it is preferred that the whole of the junction be substantially orientated and be substantially thinner than the original starting material.

In FIG. 5, the second zones 21 (see FIG. 2) have stretched before the first zones 20, and the first zones 20 have not been fully stretched (or even a small centre zone of unorientated material was left in each of the zones 20), leaving the central zone 27 of the junction 26 in the form of a lump. The maximum thickness of the junction 26 is in the lump or central zone 27, and the lump is surrounded by thinner, orientated zones with which the lump merges. The lateral zones 28,28' indicated in FIG. 5 are orientated and can have a thickness which is slightly greater than that of any of the strands 17 or 25, where they pass into the junction 26, and roughly equal to or slightly greater than the thickness of the mid-point of the strands 17 and 25. As mentioned above, there are flat marginal zones 28" around each crotch. The structure can have approximately the same strength along each axis if the cross-section and spacings of the strands 17 and 25 are equal. The formation of the type of junction 26 shown in FIG. 5 is facilitated by not allowing the material to shorten in the second stretching direction when carrying out the first stretching operation, allowing the orientation to pass well into but not right through the first zones 20. The formation is further facilitated by having some restraint in the first stretching direction when carrying out the second stretching operation.

FIGS. 21 to 21d illustrate a junction 26 which is very similar to that of FIG. 5, but has been produced in a continuous production plant as described below with reference to FIG. 11 and Example 12. FIG. 20 shows the intermediate or uniaxially stretched structure. There was 5.5% sideways contraction during the first stretch but no lengthwise contraction during the second stretch. The central zone of lump 27 is smaller in plan view and also somewhat thinner, and the surrounding zones 28,28' and 28" of highly orientated material are wider.

As can be seen in FIG. 21d, the edges of the crotches have a slight thickening (maxim slope 2°, maximum included angle 4°), but there is no sharp or abrupt increase in thickness. As can be seen in FIG. 21c, the marginal zones 28" of the crotches are flat and nearly parallel faced, the central zone 27 then rising sharply as one approaches the centre of the junction. The central zone 27 is more quadrilateral than that of FIG. 5, and while its N and S sides are convex, its E and W sides are convex, having slight reentrants on the axes of the strands 25. The top of the central zone 27 is nearly flat, but has a slight convexity, the thickest point being in the very centre.

FIGS. 21 to 21d illustrate a junction 26 which is very similar to that of FIG. 5, but has been produced in a continuous production plant as described below with reference to FIG. 11 and Example 12. FIG. 20 shows the intermediate or uniaxially stretched structure. There was 5.5% sideways contraction during the first stretch but no lengthwise contraction during the second stretch. The central zone of lump 27 is smaller in plan view and also somewhat thinner, and the surrounding zones 28,28' and 28" of highly orientated material are wider.

As can be seen in FIG. 21d, the edges of the crotches have a slight thickening (maximum slope 2°, maximum included angle 4°), but there is no sharp or abrupt increase in thickness. As can be seen in FIG. 21c, the marginal zones 28" of the crotches are flat and nearly parallel faced, the central zone 27 then rising sharply as one approaches the centre of the junction. The central zone 27 is more quadrilateral than that of FIG. 5, and while its N and S sides are convex, its E and W sides are concave, having slight reentrants on the axes of the strands 25. The top of the central zone 27 is nearly flat, but has a slight convexity, the thickest point being in the very centre.

FIG. 7 illustrates a junction 26 generally as that of FIG. 6 would appear on further stretching in the second direction. The raised central zone 27 is long-shaped and aligned with the strands 25, and extends into zones or lumps 29 at each end, which lumps 29 are thicker than the central zone 27 and adjacent the ends of the strands 25, the whole forming a dog-bone-like shape as can be seen in the Figure. There is a reentrant at end E and W end of the central zone 27 and lumps 29, on the axes of the strands 25.

FIG. 8 illustrates a junction 26 generally as that of FIG. 7 would appear on further stretching in the second direction. The central zone 27 extends into lumps 30, the whole forming a dub-bell-like shape but generally similar to the dog-bone of FIG. 7. However, the E and W ends of the central zone 27 and lumps 30 slope down gradually into the strands 25.

FIG. 9 illustrates a junction 26 generally as that of FIG. 8 would appear on further stretching in the second direction. The central zone 27 is long-shaped and merges smoothly with each of the strands 25 with no rapid decrease in thickness, though there is a slight thickening in the zones 31. Two sections through the junctions 26 are shown in FIGS. 9a and 9b. The edges of the zones 31 extend as far as, and form part of, the edges of the crotches, giving a steep rise as one follows round the edges of the crotches.

Production of the junctions 26 described above depends upon the shapes and spacings of the holes or depressions, stretching conditions such as the temperature, and the plastics material. The details given below are given for guidance and not to limit the invention.

There is a tendency for junctions of the type shown in U.K. Patent Specification No. 1 310 474 to be formed if the sheet thicknesses are below 1.5 mm, particularly if the w:d ratio (the ratio of the distance w between holes or depressions of adjacent columns or rows in the starting sheet to the thickness d of the sheet) is too high; this tendency increases as the sheet thickness decreases below 1 mm and particularly as the sheet thicknesses decrease into the range of 0.75 mm down to 0.5 mm. This tendency can be reduced by avoiding any raised edges around the holes, e.g. caused by embossing, or by reducing the w:d ratio. However, a preferred lower limit for the thickness of the starting material is 1 mm, for which it has been found that the thickest zone of a junction 26 can be down to about 0.7 mm thick; for 0.75 mm thick starting material, the corresponding junction thickness would be about 0.55 mm.

More generally, it is believed that the behaviour of the material alters at smaller thicknesses because the sizes of the molecules themselves become more relevant. It is believed that one will not necessarily achieve a structure like that of the invention using a starting material which, compared to that of any of the Examples below, is scaled down (i.e. in thickness, hole size and pitch in each direction), e.g. to thicknesses of 0.5 mm and below.

It is preferred to use stretching temperatures which are below manufacturers' recommended stretching temperatures, e.g. 97° C. for HDPE (high density polyethylene) instead of just below 126° C.

In the first stretching operation, the orientation may not pass through the notional junction zones 13 (FIG. 1), if this is desired, or may not even pass sufficiently far into the zones 13. This tendency can be avoided or reduced if desired by decreasing the distance between the holes or depressions in the first stretching direction (decreasing the w:d ratio), decreasing the distance between the holes or depressions in the second stretching direction or decreasing the radius of the corners of the holes or depressions.

Though the limits may be exceeded by adjustment of other parameters, it has been found that for satisfactory orientation for uniaxially stretched structures, the w:d ratio should be around 6.35 or below and for biaxially stretched structures around 4.23 or below.

The stretch ratios employed will depend on the actual plastics material used and on the dimensions of the starting material, but as a general indication, for biaxially stretched structures with satisfactory orientation of the junctions without excessive material in the junctions, an area stretch ratio (ratio of final, relaxed area to original area) of at least about 13:1 should be produced.

If there is to be substantial restraint in the first stretching direction during the second stretching operation, care should be taken to avoid pulling the zones 20 (FIGS. 2 and 20) right out; pulling the zones 20 right out forms thin zones in the junctions. It is believed that if the zones 21 orientate before the zones 20 in the second stretch, the unwanted junction will not be produced, but it is not necessarily undesirable that the zones 20 should orientate first, particularly if there is no restraint during the second stretch. If the unwanted junctions are produced, a test piece should be made in which the orientation penetrates less through the zones 20 in the first stretch; this can be done during the first stretch by decreasing the stretch ratio and/or increasing the restraint in what will be the second stretch direction. More specifically, if there is to be substantialy restraint during the second stretch, the orientation during the first stretch is preferably not taken right through the zones 20, though the orientation should pass beyond the notional tangent line 19 (FIG. 1) or 19' (FIGS. 2 and 20) to make a junction that does not contain too much plastics material. Difficulties may be encountered if the penetration (distance y in FIGS. 2 and 20) is greater than 30% of the distance between the notional tangent lines 19', 19" (defining a parallel-sided zone or the bar width), though the structure shown in FIG. 2 may be satisfactory if there is not excessive restraint during the second stretch. The preferred percentage for trouble-free operation is 25% and below, 20% and below being a more acceptable value.

In general, decreasing the w:d ratio increases the tear resistance.

GENERAL

The starting material can be ,of any suitable thickness from 0.75 mm upwards and in sheet form or tubular. The preferred material is strictly uniplanar, by which is meant that, ignoring any membrane (which may not lie on the median plane), all zones of the starting material are symmetrical about the median plane of the starting material. However, insubstantial departures from uniplanarity are not excluded. The holes (or depressions if suitable) can be formed by punching or by forming them as the starting material itself is formed, obturating a slit die for instance generally as in French Patent Specification No. 368 393. In general, it is preferred to avoid any substantial protuberance around the periphery of the holes or depressions, particularly when producing biaxially stretched structures; thus the zones 21 preferably have flat top and bottom faces, as illustrated in FIGS. 4c and 4d, and this is believed to reduce any tendency for thin spots to form in the junctions of the biaxially stretched structures. If depressions are formed, the membrane closing the depressions can be ruptured during stretching and the residual film-like material removed.

The starting material is preferably not substantially orientated, though melt flow orientation can be present.

The starting material can be any suitable thermoplastics material, such as for instance HDPE, low density polyethylene, polypropylene (PP), copolymers of HDPE and polypropylene, and polyamides. The starting material can have a skin on each face containing an ultra-violet stabiliser—the greater the width:depth ratio of the orientated strands in the product the more effective the ultra-violet stabilisation as the unstabilised sides of the strands and junctions form a smaller proportion of the total surface area. To enable the mesh structure to be used for laminating, whether to one or more like mesh structures or to one or more different materials such as fabric or film, the starting material may have a special layer on one or both faces. This layer may be of a substance such as low density polyethylene or ethylene vinyl acetate which melts or becomes tacky at a temperature at which the main component of the structure would not de-orientate. The layer or layers could be applied by coextrusion coating.

After stretching, the structures can be annealed in a manner well known.

FIG. 10 shows various shapes for the holes or depressions. For producing uniaxially or biaxially stretched structures, the grid on which the centres lie can be square or rectangular.

Depending somewhat on the shape of the holes, in general the area of the holes or depressions is preferably less than 50% of the plan view area of the starting material, and more preferably less than 25%.

As related to the cross-sectioned area of the mid-points of the strands 17 or 25, the biaxially-stretched polypropylene structures of the invention can have tensile strengths at break, in each strand direction, of greater than 400 Newtons/mm$^2$; breakage normally takes place at or near the mid-points of the strands, but if it does not do so, the tensile force is still measured at break. Less robust polypropylene structures, while still being in accordance with the invention, can have a strength, in each direction, or an average of the strengths in each of the two directions, down to 200 or 300 N/mm$^2$. These strengths should also be related to the weight of plastics material in the junction or per square meter of plan view area of the structure, as such weights can be significantly lower than those in for instance U.K. Patent Specification No. 982 036. The strengths must also be related to the plastics material used—for instance HDPE is generally weaker than polypropylene.

As related to the cross-sectional area of the mid-points of the strands 17, the uniaxially-stretched polypropylene structures of the invention can have tensile strengths at break, at right angles to the bars, of greater than 400 or 500 Newtons/mm$^2$. Less robust polypropylene structures, while still being in accordance with the invention, can have tensile strengths of 300 N/mm$^2$ or even lower. These strengths should be related to the weight of plastics material in the bars or unit weight of the structure, though the bar widths will be chosen in accordance with the specific use of the structures. As above, different strengths must be expected for different plastics materials.

PLANT

The plant is shown schematically in FIG. 11, but the units themselves are conventional units.

In the plant of FIG. 11, there is a let-off unit 41 supporting a roll 42 of unperforated starting material which passes through the plant along the path indicated by the dashed lines and arrows. The starting material passes through a sheet flattening unit 43, a perforator 44, a transverse direction (TD) orientation (stretching) machine 45 in the form of a clip stenter, a machine direction (MD) orientation (stretching) machine 46, and is wound up on a wind-up unit 47. Hot air heating is employed in each machine 45, 46. The material is not cooled down substantially between the first and second stretches. After the second stretch, there is a small amount of hot MD relaxation, and the structure is then cooled while held in its slightly relaxed configuration. In the second orientation machine 46, the amount of transverse contraction depends on the distance between the nips; if the distance is not too short, some transverse contraction of the mesh structure will occur. If substantially no transverse contraction should occur, the nips should be brought very close together, though this gives problems due to interference of the rolls and drives.

Figure 11A:
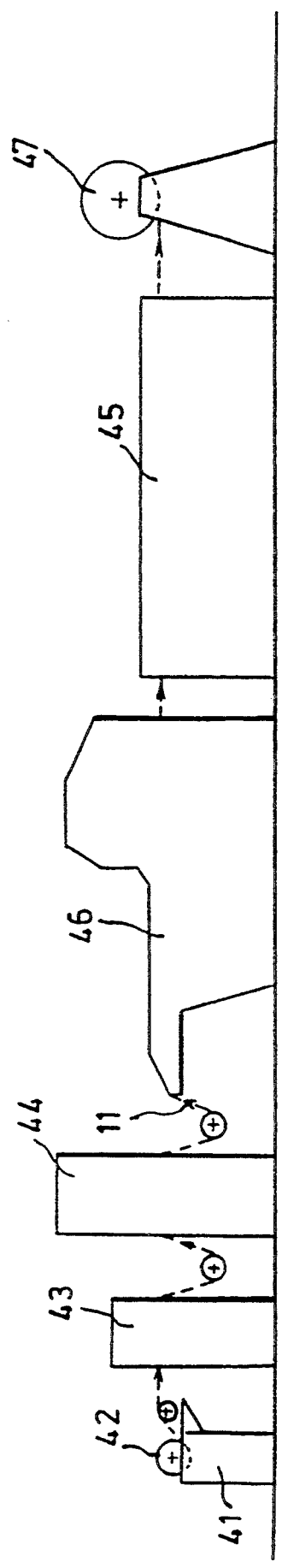

In the plant of FIG. 11a, the TD orientation machine 45 comes after the MD orientation machine 46. In this case, with relatively short nips in the MD orientation machine, significantly less transverse contraction occurs than in the plant of FIG. 11. In the TD orientation machine 45 MD tension can be maintained so that there is no bow-back of the mesh structure as it is stretched transversely, so that the structure does not contract (shorten) substantially in the machine direction.

The first stretching operation can be carried out in the transverse direction or in the machine direction in a continuous plant. It is easier to have full restraint during TD stretching and to allow contraction during MD stretching.

EXAMPLES

Tables 1 and 2 set out the procedure and results, respectively for 14 different Examples. All dimensions are in mm. "—" means that the value was not recorded. Stretch ratios are overall. For the w/d ratios in Table 1, w was measured at right angles to the first stretch direction. In Table 1, the hole size is the hole diameter (or width in the case of Example 3). In Table 2, all the columns record thicknesses unless otherwise indicated. y % is the percentage y is of the bar width. The weight per m$^2$ is per square meter of plan view (including openings).

In Examples 1 to 10, there was no restriction of the material in the direction at right angles to the stretching direction, both in the first stretch and in the second stretch. In Example 11, there was some restriction, though not complete restriction, in the direction at right angles to the stretching direction during the second stretch, the first stretch being unrestricted. In Example 13, there was full restraint in both stretching directions. The restraints in Examples 12 and 14 are indicated below.

In the Examples, there were variations across the sample due to small changes in thickness of the starting material and other reasons, but the results given are believed to be representative of the structures obtained. Examples 1 to 11 and 13 were prepared on laboratory testing apparatus. Examples 12 and 14 were taken off production runs, and there was somewhat more irregularity.

The process conditions for Example 12 were as follows:
  Plant: as FIG. 11a;
  Starting material width: 824 mm, including 20 mm margin on each edge (distance of side most edge of hole to edge of starting material). This margin can later be trimmed, if desired;
  Initial speed of advance: 5 meters/minute;
  Rate of stretch, first (MD) stretch: over a nip length of 300 mm;
  Rate of stretch, second (TD) stretch; over an MD length of 8 meters;

Relaxation (TD only): 5%

During the MD stretch, 4.5% transverse contraction occurred, although there was considerable restraint. No MD contraction occurred during the TD stretch.

The process conditions for Example 14 were as follows:

Plant: as FIG. 11;

occurred, which is virtually as though there was no transverse restraint.

It was observed that in Examples 1 to 11 and 13, stretching began randomly throughout the material in the zones corresponding to the eventual mid-points of the strands. This could not occur during the MD stretching in Examples 12 and 14, which are of a continuous process.

TABLE 1

| No | Material | Starting Material | Hole size | Hole shape | w/d | Pitch in 1st stretch direction | Pitch in other stretch direction | 1st stretch ratio | 2nd stretch ratio | Area stretch ratio | Temp °C. |
|---|---|---|---|---|---|---|---|---|---|---|---|
| 1 | HDPE | 4.5 | 6.35 | circular | 1.056 | 12.7 | 11.1 | 4.5:1 relaxed to 4.25:1 | 0 | — | 97 |
| 2 | " | " | " | circular | 4.23 | 19.05 | 25.4 | 3:1 | 0 | — | " |
| 3 | " | 1.5 | 12.7 | square, radiussed corners | 2.12 | 25.4 | 15.88 | 4.5 | 0 | — | " |
| 4 | " | 1 | 6.35 | circular | 6.35 | 12.7 | 12.7 | 6.1 | 0 | — | " |
| 5 | " | 4.5 | " | circular | 1.41 | " | " | 4:1 | 3.5:1 | 14:1 | " |
| 6 | " | " | 12.7 | circular | 2.11 | 22.2 | 22.2 | " | 3.8:1 | 15:1 | " |
| 7 | " | " | 6.35 | circular | 3.5 | 12.7 | " | " | 4.5:1 | 18:1 | " |
| 8 | " | " | 12.7 | circular | 2.11 | 2.22 | 22.2 | " | 5.5:1 | 22:1 | " |
| 9 | " | 1.5 | 6.35 | circular | 4.23 | 12.7 | 12.7 | 5:1 | 5:1 | 25:1 | 110 |
| 10 | " | " | " | circular | 4.23 | " | " | " | " | 25:1 | 120 |
| 11 | " | 4.5 | 3.18 | circular | 0.71 | 6.35 | 6.35 | 3.5:1 | 3.75:1 | 13:1 | 97 |
| 12 | PP | 3 | 6.35 | circular | 2.12 | 12.7 | 12.7 | 4.25:1 | 5.9:1 | 25:1 | 98 |
| 13 | " | " | " | circular | " | " | " | 4.5:1 | 4.25:1 | 19:1 | 99 |
| 14 | HDPE | " | " | circular | " | " | " | 3.75:1 | 3.62:1 | 14:1 | 98 |

TABLE 2

| No. | Most Similar Figure | Mid point zone 20 | Midpoint strand 17, uniax | x | y | % y | Uniax gm wt per m² | Uniax tensile strength N/mm² | Midpoint strand 17, biax | Midpoint strand 25 | Midpoint zone 27 | Zone 28 | Zone 28' | Zone 28'' | Zone 29, 30 or 31 | Biax gm wt per m² | Biax tensile strength N/mm² N-S | E-W |
|---|---|---|---|---|---|---|---|---|---|---|---|---|---|---|---|---|---|---|
| 1 | 2 | 4.23 | 1.35 | 4 | — | — | — | — | — | — | — | — | — | — | — | — | — | — |
| 2 | * | 4.5 | 1.39 | — | — | — | — | — | — | — | — | — | — | — | — | — | — | — |
| 3 | * | 1.5 | 0.51 | — | — | — | — | — | — | — | — | — | — | — | — | — | — | — |
| 4 | * | 1 | 0.23 | — | — | — | — | — | — | — | — | — | — | — | — | — | — | — |
| 5 | 6 | — | — | — | — | — | — | — | 1.37 | 1.61 | 4.33 | 1.63 | 2.43 | — | — | — | — | — |
| 6 | 7 | — | — | — | — | — | — | — | 1.3 | 1.8 | 2.7 | 3.52 | — | — | 3.8 | — | — | — |
| 7 | 8 | — | — | — | — | — | — | — | 1.5 | 2 | 2 | 1.5 | — | — | 3.2 | — | — | — |
| 8 | 9 | — | — | — | — | — | — | — | 1.2 | 1.8 | 1.6 | 1.36 | — | — | 2.4 | — | — | — |
| 9 | 9 | 1.3 | 0.33 | — | — | — | — | — | 0.35 | 0.43 | 0.58 | 0.37 | — | — | 1.15 | — | — | — |
| 10 | 9 | 1.33 | 0.33 | — | — | — | — | — | 0.4 | 0.38 | 0.62 | 0.37 | — | — | 1.12 | — | — | — |
| 11 | 5 | — | — | — | — | — | — | — | 1.85 | 1.7 | 3.22 | 2.2 | — | — | — | — | — | — |
| 12 | 21 | 2.92 | 0.72 | 0.7 | 1.1 | 17 | 515 | 416 | 0.79 | 0.66 | 2.73 | 0.89 | 0.98 | 1 | — | 105 | 225 | 480 |
| 13 | 22 | 2.97 | 0.63 | 1 | 1.6 | 25 | 486 | 1517 | 0.66 | 0.72 | 2.71 | 0.76 | 1.25 | 1.18 | — | 122 | 410 | 419 |
| 14 | 7 | 2.92 | 0.96 | — | 1.5 | 24 | 613 | 220 | 0.98 | 1.02 | 1.85 | 0.95 | 1.96 | 1.01 | 2.06 | 228 | 141 | 195 |

Starting material width: as for Example 12;
Initial speed of advance: 5 meters/minute;
Rate of stretch, first (TD) stretch: over a MD length of 8 meters;
Rate of stretch, second (MD) stretch: over a nip length of 300 mm;
Relaxation (MD only): 5%.

No MD contraction occurred during the TD stretch. During the MD stretch 25% transverse contraction The structure of Example 1 was especially suitable for embankment stabilisation (see below) and had excellent properties in respect of break load per meter width and tensile deformation.

The structures of Examples 2, 3 and 4 are uniaxially stretched structures, but the orientation does not pass right through the zones 20. In Examples 2, 3 and 4 the lengths of the part of the zone 20 which has not been stretched is 7, 10.5 and 2.5 mm respectively, these values being 1.56, 7 and 2.5 times the thickness of the material respectively.

In Example 7, the mid-point of the zone 27 was very slightly thicker than the mid-point of the strands 25, but in substance the thicknesses were equal.

In Example 11, there was a w:d ratio of less than unity, and it will be noted that although the stretch ratios were relatively low, the whole of the junction 26 was orientated.

Figure 19:
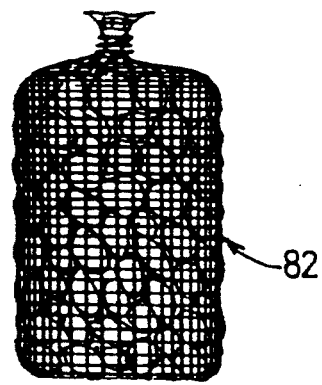

FIGS. 19 to 20d are taken from the product of Example 12 and FIGS. 21 to 21d are taken from the product of Example 13.

NON-UNIFORM STRUCTURES

The mesh structures of this invention need not be uniform along the whole of their length, and specific non-uniformities can be introduced for specific purposes, for instance to produce a carrier bag.

In one example, a tubular structure is in the form of sections of uni-axially (machine direction) orientated mesh (as in FIG. 2) separated by pieces of unstretched plastics material which when the tubular structure is cut into suitable lengths, from the tops, or tops and bottoms, of carrier bags.

USES

The uniaxially stretched structures can be used for instance for sunshades, crop shading, mow fencing, windbreaks, cladding material, anti-dazzle screens, insect screening or ground retaining or stabilising.

The biaxially stretched structures can be used for instance for stock fencing, horticultural use, civil engineering use, olive harvesting and reinforcement between laminated sheets.

RETAINING OR STABILISING PARTICULATE MATERIAL

Structures generally in accordance with the invention can be used for retaining or stabilising particulate material of any suitable form, such as soil, earth, sand, clay or gravel, and in any suitable location, such as on the side of a cutting or embankment, beneath a road surface, runway surface or railway track, beneath a building or beneath a quay; it is considered that the structure can be specially suitable for preventing retaining walls being forced out of position by the pressure of particulate material behind them. Retaining is a specific instance of stabilising.

The preferred structure for retaining or stabilising is the uniaxially stretched structure, though biaxially stretched structure could be used.

The mesh structure will normally be placed roughly parallel to the surface of the particulate material, eg. horizontally below a roadway or inclined if near an embankment or cutting surface. The mesh structure is preferably substantially rectilinear in section normal to its "plane", at least in the section taken parallel to the orientated strands which will normally be parallel to the line of expected tension on the mesh structure. This enables the tensile strength of the mesh structure to be fully exploited.

The mesh structure can have practical utility without specific fixed retention, but it is preferably fixed to at least one substantially rigid member. There may be just a single for instance running along one edge of the mesh structure, or there may be two spaced, parallel members, for instance along opposite edges of the mesh structure, or there may be a number of parallel members spaced at intervals. The member(s) can be substantially normal to the orientated strands referred to above.

The or each substantially rigid member is preferably made of a cast material into which the mesh structure has been incorporated before setting, a suitable material being concrete, but alternatively the mesh structure could be fixed in other ways to one or more pre-cast members or to for instance one or more steel plates. The member eg. along one edge of the mesh structure could be a retaining wall.

In FIG. 12 a mesh structure 51 has had two opposite edge zones cast into substantially rigid concrete members or beams 52. The mesh structure has parallel, orientated strands 53 i.e. generally at right angles to the retaining wall 55 and the corresponding face of the earth structure, and parallel bars 54, the mesh structure being a uniaxially stretched structure as described for instance with reference to FIG. 2 and Example 1. It will be seen that the bars 54 are incorporated in the beams 52 and during the moulding of the bears 52, the concrete is vibrated so that it passes in between the strands 53 and locks firmly around the bars 54.

FIG. 13 shows the application of the structure of FIG. 12, to prevent a retaining wall 55 being forced out of position by the pressure of earth 56. There are a number of parallel layers of the mesh structure 51, spaced one above the other, buried in the earth 56, the end beam 52 of each layer being incorporated in the retaining wall 55. It will be seen that the beams 52 of one layer are positioned directly above the beams 52 of the next layer. The expected tension on the mesh structure 51 is in the direction of the strands 53, and each layer is rectilinear in the section of FIG. 13. The mesh structure itself has good slip resistance properties with respect to the earth 56, but the beams 52 (other than those in the wall 55) increase the slip resistance so that the mesh structures 51 act as a tie to prevent the retaining wall 55 being forced out of its vertical position. The earth structure of FIG. 13 is formed by placing on soil a generally horizontal first layer of the mesh structures 51, the end of the mesh structures 51 being secured to a respective beam 52 which will form part of the retaining wall 55, placing a first layer of soil 56 on the first layer of mesh structure 51, to thereby embed the first layer of mesh structure 51 in the soil and apply to the first layer of mesh structure 51 a continuous load in the direction of the orientated strands and increase the strength of the soil around the first layer of mesh structure 51 and then placing on the first layer of soil 56 a generally horizontal second layer of mesh structure 51, and so on. As mentioned above, a biaxially-stretched structure could be used instead of the uniaxially-stretched structure, and one set of orientated strands of the biaxially-stretched structure will be at right angles to the facing wall 55 and will take the continuous load on the mesh structure.

In FIG. 14, spaced layers of a uniaxially stretched structure 61, as described for instance with reference to FIG. 2 and Example 1, are buried in an earth embankment.

The earth embankment extends form one sloping face to another sloping face, and is made by placing on the ground a horizontal first layer of the structure 61, placing a first layer of earth on the first layer of structure 61 whilst leaving the end portions of the structure 61 protruding from each face, the bars 54 (see the structure 61 in FIG. 12) extending parallel to the faces and the strands extending at right angles to the faces, to thereby embed the first layer in the earth and apply to the first layer of structure 61 a continuous load in the direction of the strands and increase the strength of the earth around the first layer, bringing said end portions up the faces and laying the endmost parts thereof on top of the first layer of earth, and then placing a second layer of structure 61 on the first layer of earth, and so on. As mentioned above, a biaxially-stretched structure could be used instead of the uniaxially-stretched structure.

FURTHER USES OF THE INVENTION

Figure 15:
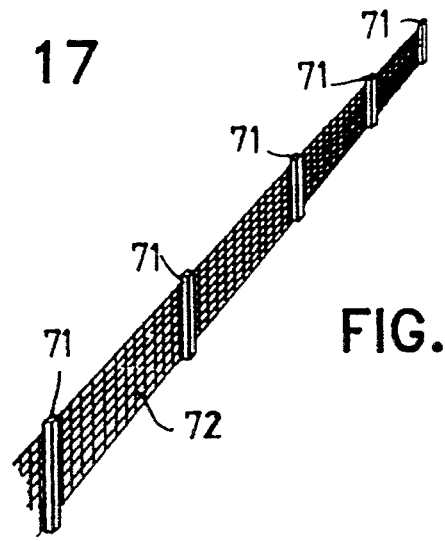

FIG. 15 illustrates a composite structure provided by erecting support members in the form of fencing posts 71 and supporting a mesh structure 72 thereby in a conventional manner. If the mesh structure 72 is to serve as for instance a highway anti-dazzle fence, it will be a uniaxially-stretched structure in accordance with FIG. 2 with the strands 17 extending vertically and the bars extending hortizontally. If it is to serve for instance as stock fencing, it will be a biaxially-stretched structure in accordance with FIG. 3 with the strands extending horizontally and vertically.

Figure 16:
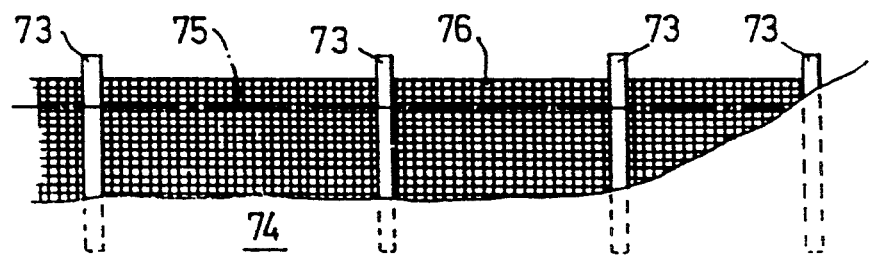

FIG. 16 illustrates a composite structure provided by erecting support members in the form of posts 73 on a sea or river bed 74. The high water level is at 75. A biaxially-stretched structure 76 in accordance with FIG. 3 is upported by the posts 73 in a conventional manner to serve as a fish trap or other submerged enclosure.

Figure 17:
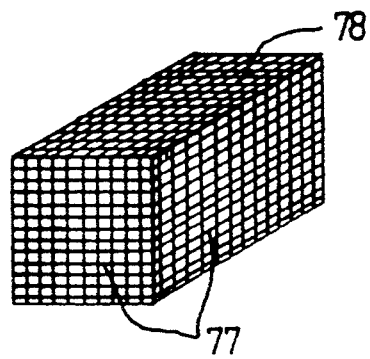
FIGS. 15 to 19 are schematic representations of further uses of the invention.

FIG. 17 illustrates a different form of submerged enclosure, namely a cage or "pocket" for raising oysters. The sides 77 of the cage can act as the support members for the adjacent sides and top 78 and the bottom acts as a support member for the sides. The sides 77 and top 78, and the bottom if desired, are formed of a biaxially-stretched mesh structure in accordance with FIG. 3 and are secured together in a conventional manner.

Figure 18:
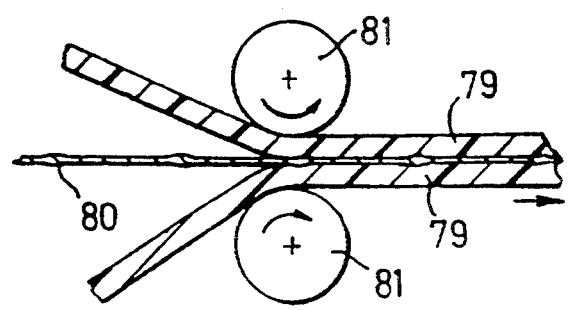

FIG. 18 illustrates the reinforcement of two films 79 by laminating between them a biaxially-stretched mesh structure 80 in accordance with FIG. 3 which has on either side a layer of a low-melting plastics material, as referred to above. The structure 80 is heated by conventional means (not shown) before reaching laminating rolls 81, but not to such a temperature that the main part of the structure deorientates.

FIG. 19 illustrates a container 82 in the form of a sack or bag for agricultural or horticultural produce. The container 82 is formed of tubular biaxially-stretched mesh structure in accordance with FIG. 3, closed at the top and bottom by conventional means.

I claim:

1. A method of constructing a civil engineering structure, comprising: providing a mass of particulate material and a reinforcing means therefor, said reinforcing means comprising at least one generally horizontally extending layer of a flexible, integral, plastics material mesh structure, said mesh structure having upper and lower faces and comprising molecularly orientated longitudinal strands interconnected by substantially parallel transverse members thereby defining a general square or rectangular grid, said orientated strands and said transverse members defining therebetween mesh openings whose dimension in a direction parallel to said orientated strands is at least several multiples of the width of the mid-points of said orientated strands between said transverse members, portions of said mesh structure at the intersection of the axes of said orientated strands and said transverse members being unorientated or substantially less orientated than the midpoints of oriented strands connected thereby, said portions of said mesh structure at the intersection of the axes of said orientated strands and said transverse members also being thicker than the thickness of said midpoints of said orientated strands, said mesh structure having been formed by stretching a sheet of starting material having opposite faces, a thickness of not less than 1.5 mm, and a pattern of holes whose centers lie on a notional, substantially square or rectangular grid of rows and columns, the stretching of the starting sheet having been effected at least in the direction parallel to the columns, and the stretching in the direction of said columns having been effected to such extent that notional points which, on each face of the starting sheet, lay on notional straight lines which are parallel to the rows and tangential to respective holes, have moved into the corresponding strands; and embedding said reinforcing means in said mass of particulate material with portions of said mass of particulate material being below said mesh structure, portions of said mass of particulate material being above said mesh structure, and portions of said mass of particulate material being within the mesh openings defined by said mesh structure, so that portions of said particulate material are in direct contact with said upper and lower faces of said mesh structure and with portions of said mesh structure defining said mesh openings;

whereby said mesh structure has good slip resistance properties with respect to said particulate material and provides good stress transmission paths in said civil engineering structure.

2. The method of claim 1, wherein said mass of particulate material and reinforcing means together define a reinforced embankment, said mesh structure being uniaxially orientated, and said mesh structure is embedded in said mass of particulate material with tension generally in the direction of said orientated strands.

3. The method of claim 1, wherein said civil engineering structure includes a facing wall, said mass of particulate material, reinforcing means and facing wall together defining a retained retaining wall, said mesh structure being uniaxially orientated, and said mesh structure is embedded in said mass of particulate material with tension generally in the direction of said orientated strands.

4. The method of claim 3, further comprising securing said mesh structure to said facing wall.

5. The method of claim 1 wherein said mesh structure is not subjected to any substantial restraint other than that provided by said mass of particulate material.

6. The method of claim 1, wherein said mass of particulate material and reinforcing means together define a reinforced base structure, said mesh structure being biaxially orientated and comprising a generally square or rectangular grid of orientated strands interconnected by orientated junctions.

7. The method of claim 1, wherein said particulate material is soil.

8. The method of claim 1, wherein on each side of a respective said transverse member, the orientation of said strands penetrates on each face of the mesh structure beyond notional lines which are substantially parallel to the transverse member and are substantially tangential to respective said mesh openings.

9. The method of claim 1, wherein said mesh structure is uniaxially orientated, said transverse members being in the form of bars interconnecting aligned longitudinal strands on each side of respective bars, each bar comprising a succession of alternate zones, namely first zones between and interconnecting the ends of aligned longitudinal strands and second zones between the first zones, the second zones not being substantially orientated.

10. The method of claim 9, wherein each bar, as seen in section along said notional line, has undulating top and bottom surfaces with the portions of said second zones on said notional plane being substantially thicker than the portions of said first zones on said notional line.

11. The method of claim 9, wherein each bar, as seen in section normal to said mesh structure and along notional lines which are substantially parallel to the bar and are substantially tangential to respective said mesh openings on both sides of each bar, has undulating top and bottom surfaces with the portions of said second zones on both said notional lines being substantially thicker than the portions of said first zones on both said notional lines, orientation of said orientated strands continuing substantially beyond said notional lines on both sides of each bar.

12. The method of claim 1, wherein said mesh structure is uniaxially orientated, the transverse members being in the form of bars interconnecting aligned longitudinal strands on each side of respective bars, each bar comprising a succession of alternate zones, namely first zones between and interconnecting the ends of aligned longitudinal strands and second zones between the first zones, the second zones not being substantially orientated, and said mesh structure is embedded in said mass of particulate material with said bars extending substantially right across the mesh structure.

13. The method of claim 1, wherein said mesh structure is uniaxially orientated, said transverse members being in the form of bars interconnecting aligned orientated strands on each side of respective bars, each bar having a center line minimum thickness substantially greater than the thickness of said mid-points of said aligned orientated strands, each bar comprising a succession of alternate zones, namely first zones between and interconnecting the ends of aligned orientated strands and second zones between the first zones, the second zones not being substantially orientated.

14. The method of claim 1, wherein said mesh structure is uniaxially orientated, said orientated strands at their narrowest points having a ratio of width to thickness substantially greater than unity, said transverse members being in the form of bars interconnecting aligned orientated strands on each side of respective bars, each bar having a center line minimum thickness substantially greater than the thickness of said mid-points of said aligned orientated strands, each bar comprising a succession of alternate zones, namely first zones between and interconnecting the ends of aligned longitudinal strands and second zones between the first zones, the second zones not being substantially orientated.

15. The method of claim 1, wherein at their narrowest points, the ratio of the width to the thickness of said orientated strands is substantially greater than unity.

16. The method of claim 1, wherein the median plane of said orientated strands lies within notional planes tangent to the upper and lower faces of said transverse members.

17. The method of claim 1, wherein the median plane of said transverse members lies within notional planes tangent to the upper and lower faces of said orientated strands.

18. The method of claim 1, comprising embedding multiple, generally horizontally extending, layers of said mesh structure in said mass of particulate material in vertically spaced relationship to each other.

19. The method of claim 18, comprising defining a face extending generally at an angle to the horizontal with said mass of particulate material, embedding said mesh structure in said mass of particulate material with a main part of said mesh structure extending generally horizontally to form the respective said layer, and a further part which, at about said face, extends to at least adjacent a next layer of mesh structure.

20. The method of claim 19, wherein said mesh structure further comprises an endmost part, and embedding said mesh structure in said mass of particulate material with said endmost part extending generally horizontally in spaced relationship to said main part and adjacent said next layer.

21. A method of constructing a civil engineering structure, comprising: providing a mass of particulate material and a reinforcing means therefor, said reinforcing means comprising at least one generally horizontally extending layer of a flexible, integral, uniaxially-molecularly orientated, plastics material mesh structure having a thickness of not less than 1.5 mm, said mesh structure having upper and lower faces and comprising molecularly orientated longitudinal strands interconnected by transverse bars, thereby defining a generally square or rectangular grid, respective orientated strands being aligned on each side of respective bars, said orientated strands and said bars defining therebetween mesh openings whose dimension in a direction parallel to said orientated strands is at least several multiples of the width of the mid-points of the orientated strands between said transverse bars, each said bar comprising a succession of alternate zones, namely first zones between and interconnecting the ends of aligned orientated strands and second zones between the first zones, the orientation of the strands penetrating into a respective said bar on each face of the mesh structure beyond a notional line which is substantially parallel to a respective said bar and is substantially tangential to respective said mesh openings, the mid-point of each said first zone being unorientated or substantially less orientated than said mid-points of said orientated strands connected thereby and said second zones not being substantial orientated; and embedding said reinforcing means in said mass of particulate material with portions of said mass of particulate material being below said mesh structure, portions of said mass of particulate material being above said mesh structure, and portions of said mass of particulate material being within the mesh openings defined by said mesh structure, so that portions of said particulate material are in direct contact with said upper and lower faces of said mesh structure and with portions of said mesh structure defining said mesh openings;

whereby said mesh structure has good slip resistance properties with respect to said particulate material and provides good stress transmission paths in said civil engineering structure.

22. A method of constructing a civil engineering structure, comprising;

providing a mass of particulate material and a reinforcing means therefor, said reinforcing means comprising at least one generally horizontally extending layer of a flexible, integral, biaxially-molecularly—orientated plastics material mesh structure formed from a sheet of starting material having a thickness of not less than 1.5 mm, said mesh structure having upper and lower faces and comprising a generally square or rectangular grid formed by respective sets of orientated strands interconnected by orientated junctions and defining mesh openings whose dimension in a direction parallel to each set of said orientated strands is at least several multiples of the widths of the mid-points of said orientated strands, the junctions interconnecting respective orientated strands having a profile which on each face of the mesh structure is formed at least in part by stretching and biaxially orientating said starting sheet, which profile comprises a central zone which is thicker than the mid-points of any of the orientated strands interconnected by the junction, and is unorientated or less orientated than said mid-points of said orientated strands, the junction having no thin lateral zones which could form tear starters, crotches extending between respective pairs of said orientated strands passing into the junction generally at right angles to each other, the edge zones of said crotches being continuously orientated in the direction running around the respective crotch; and embedding said reinforcing means in said mass of particulate material with portions of said mass of particulate material being below said mesh structure, portions of said mass of particulate material being above said mesh structure, and portions of said mass of particulate material being within the mesh openings defined by said mesh structure, so that portions of said particulate material are in direct contact with said upper and lower faces of said mesh structure and with portions of said mesh structure defining said mesh openings;

whereby said mesh structure has good slip resistance properties with respect to said particulate material and provides good stress transmission paths in said civil engineering structure.

23. The method claim 22, wherein there is no point within said junction which has a thickness less than 75% of the thickness of the mid-point of any strand entering the junction.

24. The method claim 22, wherein on the axis of each said orientated strand entering said junction, there is no point within said junction which has a thickness less than 75 percent of the thickness of the mid-point of the respective strand.

25. The method of claim 22, wherein the maximum thickness of said junction is substantially greater than its minimum thickness and substantially greater than the thickness of the mid-point of any of said orientated strands passing into said junction, and said junction has a central zone which is thicker than orientated zones on at least two opposite sides thereof.

26. The method of claim 22, wherein said junction has been formed from a substantially flat starting material, said junction profile having been formed substantially wholly by stretching and biaxially orientating said starting material.

27. The method of claim 22, wherein at their narrowest points, the ratio of the width to the thickness of said orientated strands is substantially greater than unity.

28. The method of claim 22, comprising embedding multiple, generally horizontally extending, layers of said mesh structure in said mass of particulate material in vertically spaced relationship to each other.

29. The method of claim 28, comprising defining a face extending generally at an angle to the horizontal with said mass of particulate material, embedding said mesh structure in said mass of particulate material with a main part of said mesh structure extending generally horizontally to form the respective said layer, and a further part which, at about said face, extends to at least adjacent a next layer of mesh structure.

30. The method of claim 29, wherein said mesh structure further comprises an endmost part, and embedding said mesh structure in said mass of particulate material with said endmost part extending generally horizontally in spaced relationship to said main part and in juxtaposition to said next layer.

31. The method of claim 2, wherein said orientated longitudinal strands extend generally at right angles to a face of said embankment, as seen from above.

32. The method of claim 9, wherein the orientation of respective said orientated strands penetrates right through said bar.

33. The method of claim 1, wherein the stretching in the direction of said columns was effected to such an extent that notional points which, on each face of the starting sheet, were on a notional plane which was normal to the starting sheet and was parallel to the rows and tangential to the respective holes, moved into a corresponding strand.

34. The method of claim 21, wherein, on each face of the mesh structure, on at least one side of respective said bars, the orientation of respective said strands penetrates into a respective said bar beyond a notional plane normal to the mesh structure, parallel to said bar and tangential to respective said mesh openings.

35. The method of claim 21, wherein said mesh structure is not subjected to any substantial restraint other than that provided by said mass of particulate material.

36. The method of claim 22, wherein said mesh structure is not subjected to any substantial restraint other than that provided by said mass of particulate material.

37. The method of claim 1, wherein said civil engineering structure defines a face and a face portion extending generally at an angle to the horizontal, and wherein said mesh structure defines at least a main part extending generally horizontally which has a portion adjacent to said face and retaining said face portion, none of the remainder of said main part being subjected to any substantial restraint other than that provided by said mass of particulate material.

38. The method of claim 21, wherein said civil engineering structure defines a face and a face portion extending generally at an angle to the horizontal, and wherein said mesh structure defines at least a main part extending generally horizontally which has a portion adjacent to said face and retaining said face portion, none of the remainder of said main part being subjected to any substantial restraint other than that provided by said mass of particulate material.

39. The method of claim 22, wherein said civil engineering structure defines a face and a face portion extending generally at an angle to the horizontal, and wherein said mesh structure defines at least a main part extending generally horizontally which has a portion adjacent to said face and retaining said face portion, none of the remainder of said main part being subjected to any substantial restraint other than that provided by said mass of particulate material.

40. The method of claim 37, wherein said face portion is defined by a facing wall and said portion adjacent said face is secured to said facing wall.

41. The method of claim 38, wherein said face portion is defined by a facing wall and said portion adjacent said face is secured to said facing wall.

42. The method of claim 39, wherein said face portion is defined by a facing wall and said portion adjacent said face is secured to said facing wall.

43. The method of claim 37, wherein said face portion comprises a mesh structure which extends up said face portion and which is connected to said main part.

44. The method of claim 38, wherein said face portion comprises a mesh structure which extends up said face portion and which is connected to said main part.

45. The method of claim 39, wherein said face portion comprises a mesh structure which extends up said face portion and which is connected to said main part.

46. The method of claim 1, comprising defining with said mass of particulate material a face extending generally at an angle to the horizontal, and embedding multiple, generally horizontally extending, layers of said mesh structure in said mass of particulate material in vertically spaced relationship to each other, said mesh structure being embedded with a main part of said mesh structure extending generally horizontally to form the respective said layer, and a further part which, at about said face, extends to at least adjacent a next layer of mesh structure, said main part not being subjected to any substantial restraint other than that provided by said mass of particulate material.

47. The method of claim 21, comprising defining with said mass of particulate material a face extending generally at an angle to the horizontal, and embedding multiple, generally horizontally extending, layers of said mesh structure in said mass of particulate material in vertically spaced relationship to each other, said mesh structure being embedded with a main part of said mesh structure extending generally horizontally to form the respective said layer, and a further part which, at about said face, extends to at least adjacent a next layer of mesh structure, said main part not being subjected to any substantial restraint other than that provided by said mass of particulate material.

48. The method of claim 22, comprising defining with said mass of particulate material a face extending generally at an angle to the horizontal, and embedding multiple, generally horizontally extending, layers of said mesh structure in said mass of particulate material in vertically spaced relationship to each other, said mesh structure being embedded with a main part of said mesh structure extending generally horizontally to form the respective said layer, and a further part which, at about said face, extends to at least adjacent a next layer of mesh structure, said main part not being subjected to any substantial restraint other than that provided by said mass of particulate material.

49. The method of claim 1, wherein said civil engineering structure defines a face and a face portion extending generally at an angle to the horizontal, and wherein said orientated strands, as seen in plan, extend generally at right angles to said face.

50. The method of claim 21, wherein said civil engineering structure defines a face and a face portion extending generally at an angle to the horizontal, and wherein said orientated strands, as seen in plan, extend generally at right angles to said face.

51. The method of claim 22, wherein said civil engineering structure defines a face and a face portion extending generally at an angle to the horizontal, and wherein one of said sets of orientated strands, as seen in plan, extends generally at right angles to said face.

52. The method of claim 1, wherein said mass of particulate material and reinforcing means together define a reinforced embankment, and said mesh structure is embedded in said mass of particulate material with tension generally in the direction of said orientated strands.

53. The method of claim 1, wherein said mass of particulate material and reinforcing means together define a reinforced embankment, said mesh structure being biaxially orientated and comprising a generally square or rectangular grid formed by respective sets of orientated strands interconnected by orientated junctions, and said mesh structure is embedded in said mass of particulate material with tension generally in the direction of said orientated strands of a said set.

54. The method of claim 1, wherein said mass of particulate material and reinforcing means together define a retained embankment, and said mesh structure is embedded in said mass of particulate material with tension generally in the direction of said orientated strands.

55. The method of claim 1, wherein said mass of particulate material and reinforcing means together define a retained embankment, said mesh structure being uniaxially orientated, and said mesh structure is embedded in said mass of particulate material with tension generally in the direction of said oriented strands.

56. The method of claim 1, wherein said mass of particulate material and reinforcing means together define a retained embankment, said mesh structure being biaxially orientated and comprising a generally square or rectangular grid formed by respective sets of orientated strands interconnected by orientated junctions, and said mesh structure is embedded in said mass of particulate material with tension generally in the direction of said orientated strands of a said set.

57. The method of claim 1, wherein said civil engineering structure includes a facing wall, said mass of particulate material, reinforcing means and facing wall together defining a retained wall, and said mesh structure is embedded in said mass of particulate material with tension generally in the direction of said orientated strands.

58. The method of claim 1, wherein said civil engineering structure includes a facing wall, said mass of particulate material reinforcing means and facing wall together defining a retained wall, said mesh structure being biaxially orientated and comprising a generally square or rectangular grid formed by respective sets of orientated strands interconnected by orientated junctions, and said mesh structure is embedded in said mass of particulate material with tension generally in the direction of said orientated strands.

59. The method of claim 21, wherein said mass of particulate material and reinforcing means together define a retained embankment, and said mesh structure is embedded in said mass of particulate material with tension generally in the direction of said orientated strands.

60. The method of claim 21, wherein said mass of particulate material and reinforcing means together define a reinforced embankment, and said mesh structure is embedded in said mass of particulate material with tension generally in the direction of said orientated strands.

61. The method of claim 21, wherein said civil engineering structure includes a facing wall, said mass of particulate material, reinforcing means and facing wall together defining a retained wall, and said mesh structure is embedded in said mass of particulate material with tension generally in the direction of said orientated strands.

62. The method of claim 22, wherein said mass of particulate material and reinforcing means together define a reinforced embankment, and said mesh structure is embedded in said mass of particulate material with tension generally in the direction of said orientated strands of a said set.

63. The method of claim 22, wherein said mass of particulate material and reinforcing means together define a retained embankment, and said mesh structure is embedded in said mass of particulate material with tension generally in the direction of said orientated strands of a said set.

64. The method of claim 22, wherein said civil engineering structure includes a facing wall, said mass of particulate material, reinforcing means and facing wall together defining a retained wall, and said mesh structure is embedded in said mass of particulate material with tension generally in the direction of said orientated strands.

65. The method of claim 21, wherein the orientation of respective said orientated strands penetrates right through said bar.

* * * * *